(12) United States Patent
Picard et al.

(10) Patent No.: US 9,594,993 B2
(45) Date of Patent: Mar. 14, 2017

(54) TWO DIMENSIONAL BARCODE AND METHOD OF AUTHENTICATION OF SUCH BARCODE

(71) Applicant: SCANTRUST SA, Lausanne (CH)

(72) Inventors: Justin Picard, St Sulpice (CH); Paul Landry, Ecublens (CH)

(73) Assignee: SCANTRUSH SA, Lausanne (CH)

(*) Notice: Subject to any disclaimer, the term of this patent is extended or adjusted under 35 U.S.C. 154(b) by 0 days.

(21) Appl. No.: 15/032,066

(22) PCT Filed: Nov. 6, 2014

(86) PCT No.: PCT/EP2014/073985
§ 371 (c)(1),
(2) Date: Apr. 26, 2016

(87) PCT Pub. No.: WO2015/067725
PCT Pub. Date: May 14, 2015

(65) Prior Publication Data
US 2016/0267369 A1  Sep. 15, 2016

(30) Foreign Application Priority Data
Nov. 7, 2013  (CH) ............... 20130001866

(51) Int. Cl.
*G06K 19/06* (2006.01)
*G06K 7/14* (2006.01)
*G06K 7/10* (2006.01)

(52) U.S. Cl.
CPC ... *G06K 19/06037* (2013.01); *G06K 7/10722* (2013.01); *G06K 7/1417* (2013.01);
(Continued)

(58) Field of Classification Search
CPC ....... G06K 19/06037; G06K 19/06075; G06K 19/06056; G06K 7/1417; G06K 7/10722; G06K 7/1434
See application file for complete search history.

(56) References Cited

U.S. PATENT DOCUMENTS 4,423,415 A    12/1983  Goldman
4,785,290 A    11/1988  Goldman
(Continued)

FOREIGN PATENT DOCUMENTS

EP    1239413 A2    9/2002
EP    1473634 A1    11/2004
(Continued)

OTHER PUBLICATIONS

International Search Report PCT/ISA/210 for International Application No. PCT/EP2014/073985 dated Feb. 6, 2015.
(Continued)

*Primary Examiner* — Daniel Walsh
(74) *Attorney, Agent, or Firm* — Harness, Dickey & Pierce, P.L.C.

(57) ABSTRACT

A method is disclosed for creating a 2D barcode. In an embodiment, the method includes: embedding primary information that can be read by a 2D-barcode-reader in a primary information pattern, and embedding secondary information that is made difficult to reproduce without alteration in a visible pattern. In an embodiment, the visible pattern is embedded within the barcode in at least one area that does not contain any primary information.

20 Claims, 8 Drawing Sheets

(52) U.S. Cl.
CPC ..... *G06K 7/1434* (2013.01); *G06K 19/06056* (2013.01); *G06K 19/06075* (2013.01)

(56) References Cited

U.S. PATENT DOCUMENTS

| | | | |
|---|---|---|---|
| 5,081,343 A * | 1/1992 | Chadima, Jr. ...... | G06K 7/10594 235/455 |
| 5,118,369 A * | 6/1992 | Shamir ................. | G09F 3/0297 156/64 |
| 5,153,418 A * | 10/1992 | Batterman ........... | G06K 7/1093 235/456 |
| 5,907,144 A * | 5/1999 | Poon ....................... | G06K 1/126 235/454 |
| 6,318,633 B1 * | 11/2001 | Drexler .................. | G06K 1/126 235/454 |
| 6,398,117 B1 | 6/2002 | Oakeson et al. | |
| 6,948,657 B2 | 9/2005 | Sugino et al. | |
| 8,180,174 B2 | 5/2012 | Di Venuto et al. | |
| 8,297,510 B1 * | 10/2012 | Yakshtes ............... | H04L 9/3247 235/462.1 |
| 2003/0002710 A1 * | 1/2003 | Rhoads ............. | G06F 17/30876 382/100 |
| 2004/0060990 A1 * | 4/2004 | Hilton .................. | G06Q 20/042 235/494 |
| 2004/0153649 A1 * | 8/2004 | Rhoads ................. | G06F 17/241 713/176 |
| 2005/0038872 A1 | 2/2005 | Ono et al. | |
| 2006/0091208 A1 * | 5/2006 | He ....................... | G06Q 10/087 235/385 |
| 2007/0143737 A1 * | 6/2007 | Huang ............. | G06K 19/06056 717/103 |
| 2007/0205258 A1 * | 9/2007 | Self ........................ | G06Q 30/06 235/375 |
| 2009/0218401 A1 * | 9/2009 | Moran ..................... | G06K 5/00 235/439 |
| 2010/0195916 A1 * | 8/2010 | Blondiaux ........... | G06K 19/086 382/209 |
| 2010/0220364 A1 * | 9/2010 | Picard .................. | G03G 21/046 358/3.28 |
| 2010/0294844 A1 * | 11/2010 | Loiret-Bernal ....... | B30B 15/065 235/494 |
| 2011/0073656 A1 * | 3/2011 | Detwiler ............ | G06K 7/10722 235/462.41 |
| 2011/0259962 A1 * | 10/2011 | Picard .................. | G06K 7/1434 235/437 |
| 2011/0290882 A1 * | 12/2011 | Gu ....................... | G06K 7/1456 235/462.11 |
| 2012/0048929 A1 | 3/2012 | Hawkins | |
| 2012/0256000 A1 * | 10/2012 | Cok ..................... | G06K 7/1447 235/462.22 |
| 2012/0327450 A1 * | 12/2012 | Sagan .................... | G03G 21/046 358/1.14 |
| 2013/0015236 A1 * | 1/2013 | Porter ................... | G06F 21/645 235/375 |
| 2013/0200144 A1 * | 8/2013 | Massicot ............ | G06K 9/00577 235/375 |
| 2013/0318351 A1 * | 11/2013 | Hirano .................. | H04L 9/3073 713/168 |
| 2014/0035720 A1 * | 2/2014 | Chapman ............ | G07C 9/00031 340/5.51 |
| 2014/0108252 A1 * | 4/2014 | Itwaru .................. | G06Q 20/202 705/44 |
| 2014/0230067 A1 * | 8/2014 | Sahita ....................... | G06T 1/60 726/26 |
| 2015/0002896 A1 * | 1/2015 | Takasu .................. | G06F 3/1209 358/1.15 |
| 2015/0036890 A1 * | 2/2015 | Biro ........................ | G07F 7/008 382/112 |
| 2015/0347887 A1 * | 12/2015 | Vosoogh-Grayli ............. | G06K 19/06037 235/454 |
| 2016/0020906 A1 * | 1/2016 | Nolte ...................... | G06F 21/83 705/71 |
| 2016/0267369 A1 * | 9/2016 | Picard .................. | G06K 7/1417 |

FOREIGN PATENT DOCUMENTS

| | | |
|---|---|---|
| WO | WO-03071481 A2 | 8/2003 |
| WO | WO-2010034897 A1 | 4/2010 |
| WO | WO-2013012794 A2 | 1/2013 |

OTHER PUBLICATIONS

Written Opinion of the International Searching Authority PCT/ISA/237 for International Application No. PCT/EP2014/073985 dated Feb. 6, 2015.

* cited by examiner

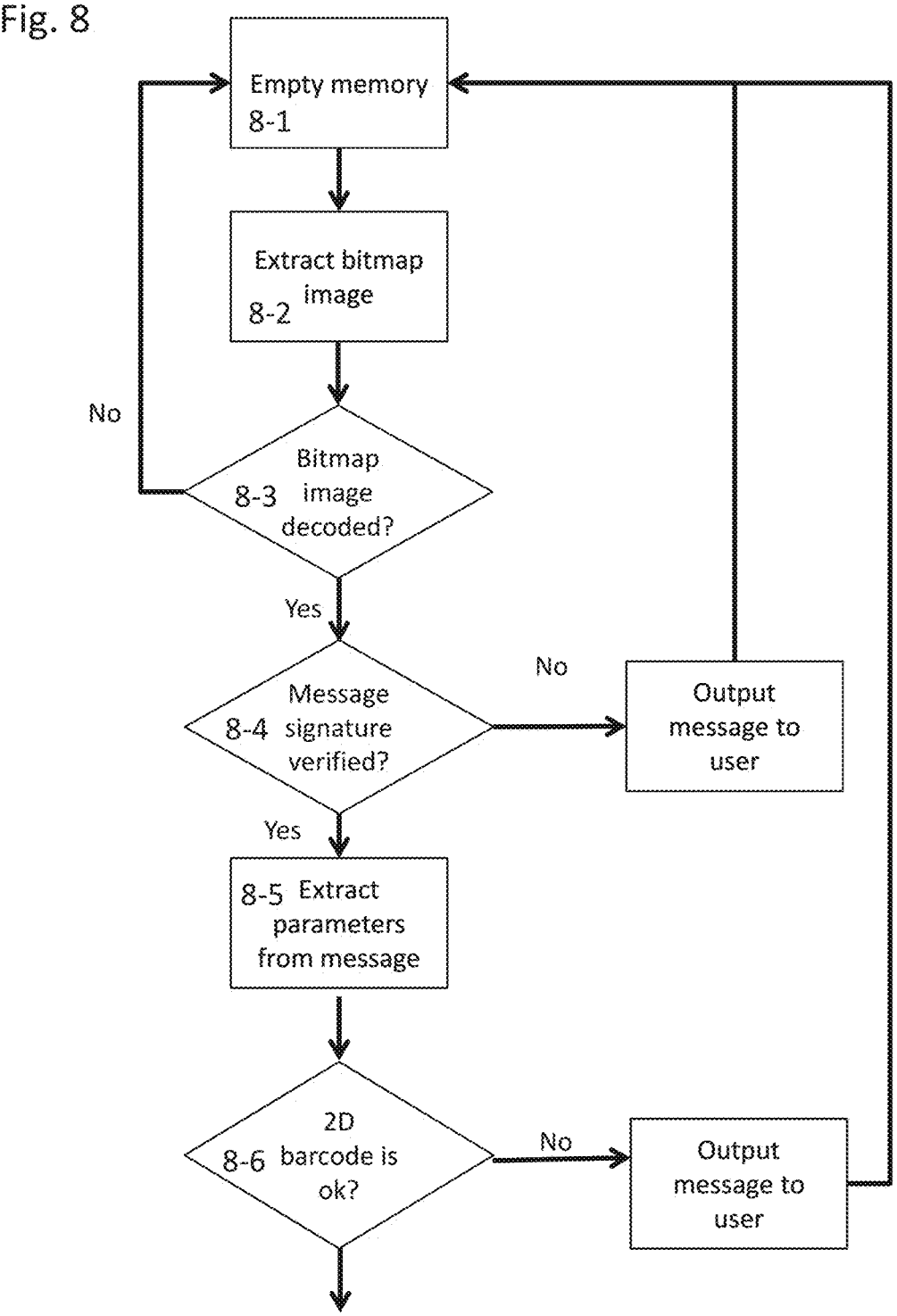

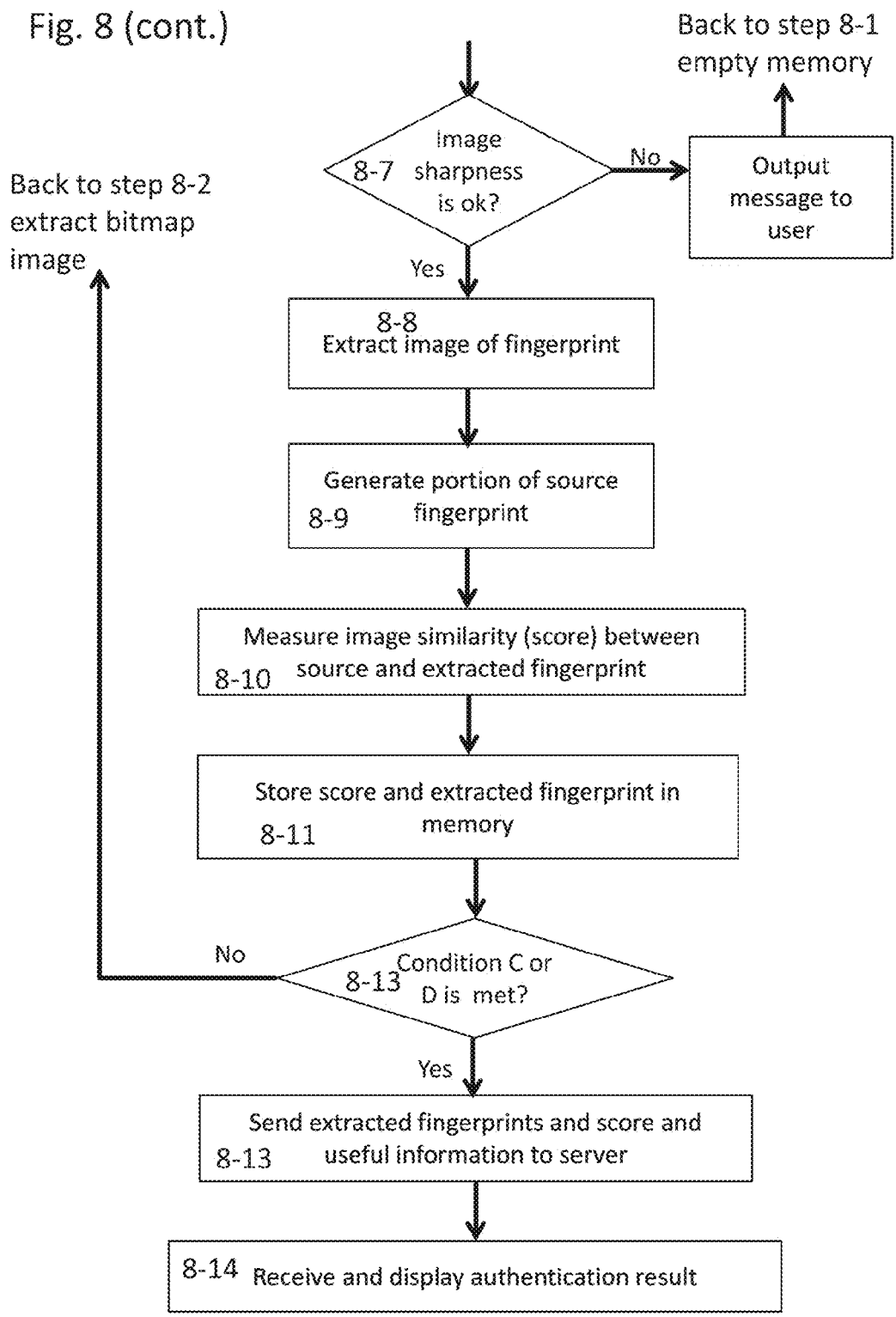

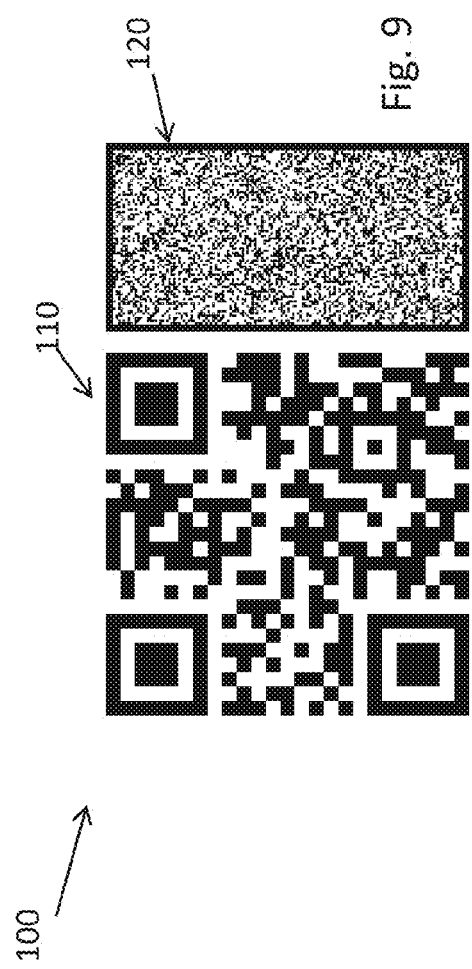
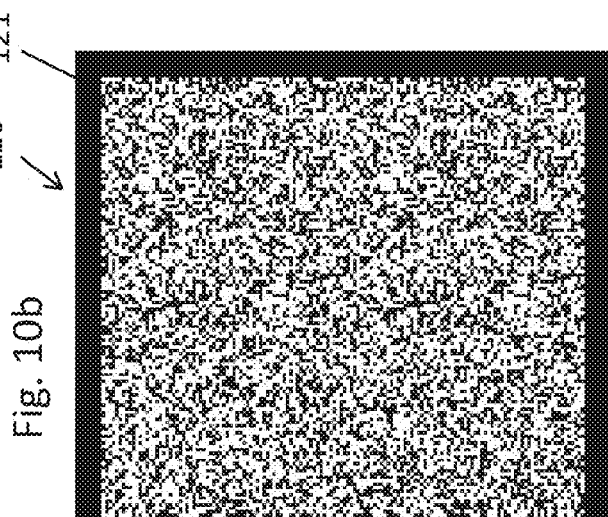
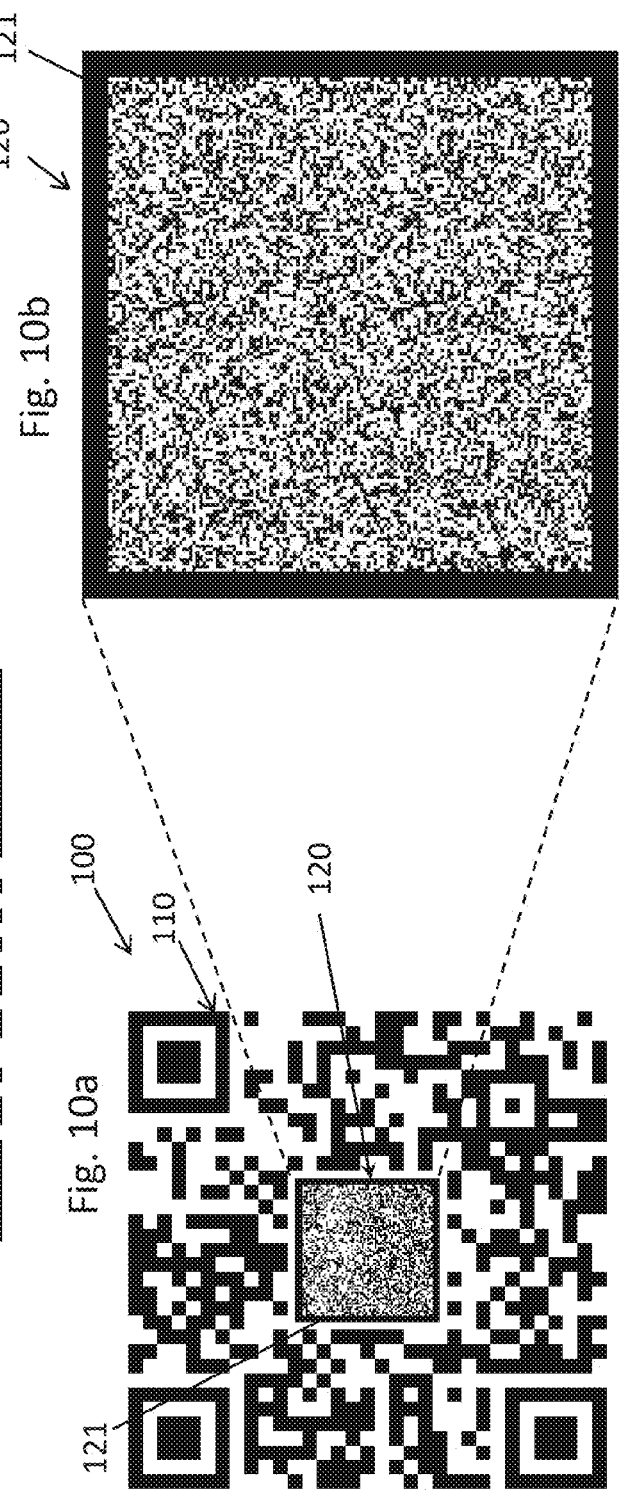

120b

120a

TWO DIMENSIONAL BARCODE AND METHOD OF AUTHENTICATION OF SUCH BARCODE

FIELD OF THE INVENTION

The present invention concerns a method for creating a 2D barcode, a product embedding a 2D barcode, a method of manufacturing such product and a method of authentication of such 2D barcode. The present invention also concerns a computer implemented method for generating a 2D barcode, a non-transient computer-readable medium and a computing apparatus used for performing such method.

BACKGROUND 2D barcodes are data carrier used to assign a unique or batch identity to a product, document or any other item. Such 2D barcodes are preferably formed by a two-dimensional grid defining a 2D matrix whose cells are coded with information, notably binary information such as 0 or 1 coding bits which in series can code different type of characters.

According to the invention all two-dimensional bar codes (2D bar codes) are concerned, and notably the very common following ones: PDF-417, MaxiCode, Datamatrix, QR Code, Aztec Code, and EAN barcodes. These barcodes can be read up to a certain degree of damage, using for instance Reed-Solomon error correction to allow correct reading even if a portion of the bar code is damaged. When the bar code scanner cannot recognize a bar code symbol, it will treat it as an erasure. Now, QR Code (Quick Response Code) and Datamatrix are the 2D bar codes used in more and more applications in diverse industries as manufacturing, warehousing and logistics, retailing, healthcare, life sciences, transportation and office automation. These are also the 2D barcodes most used by consumers to access digital information related to a physical medium.

The QR Code being the most frequently used type to scan with smartphones, with the explosive growth of smartphones, QR codes are also being widely used in mobile marketing and advertising campaigns as a fast and effective way of connecting with customers and providing end-user content, including Web links, mobile coupons, airline boarding passes, and other applications such as product tracking, item identification, time tracking, document management, general marketing, etc.

Also, the invention concerns QR codes which include aesthetically pleasing modifications, where an image is merged into the code mainly for improvement of the QR Code visual impact.

Compared with 1-D codes, 2-D codes can hold a larger amount of data in a smaller space, and compared with other 2-D codes, the QR Code and Datamatrix may potentially hold even more data. In addition, advanced error-correction methods and other unique characteristics to detect the code's presence and its positioning allow the QR Code to be read more reliably and at higher speeds than most other codes.

Like written language, barcodes are visual representations of information. Unlike language, however, which humans can read, barcodes are designed to be read and understood (decoded) by computers, using machine-vision systems consisting of optical laser scanners or cameras, more generally by barcode readers, and barcode-interpreting software. The QR Code and Datamatrix high degree of readability under low-contrast conditions may allow printing, laser etching or dot-pin marking (DPM) of a symbol directly onto a part or product.

The QR Code is a 2-D matrix code that conveys information by the arrangement of its dark and light elementary cells, also called "modules," in columns and rows, i.e. in both the horizontal and vertical directions. Each dark or light module of a QR Code symbol—a specific instance of a code—represents a 0 or 1, thus making it machine intelligible.

A QR code is detected by a 2-dimensional digital image sensor and then digitally analysed by a programmed processor. The processor locates the three distinctive squares at the corners of the QR code image, using a smaller square (or multiple squares) near the fourth corner to normalize the image for size, orientation, and angle of viewing. The small dots throughout the QR code are then converted to binary numbers and validated with an error-correcting code.

The information contained in the QR code can be used to trace a product in a distribution channel, or to detect frauds related to product, such as diversion, theft, alteration, or counterfeiting. However, even though 2D barcodes are increasingly used for anti-counterfeiting applications, they have no built-in protection against copying. They can therefore be very easily duplicated and applied to non-legitimate items, i.e. to counterfeits.

DESCRIPTION OF RELATED ART

To enhance security, barcodes used for anti-counterfeiting are complemented by a variety of physical security elements, generally extrinsic from the 2D barcode, such as holograms, special inks or taggants which can be revealed with a specific detection device (ink with specific spectral properties revealed when illuminated with a certain spectrum), microprints, etc. However, all such methods are known to be either expensive or inconvenient to integrate in production processes. In addition, they are inconvenient to verify, and easy to copy or imitate.

Other numerous methods have been proposed with security elements placed intrinsically to the 2D bar code itself and forming so-called secondary information with respect to primary information used for coding an identity or message. These primary information and secondary information, are preferably formed by black and white elementary images or elementary cells formed for instance by dots or squares, such as pixels.

As non-limitative illustration of these techniques, one can refer to the following list:

It has been proposed to insert digital watermarks, i.e. unnoticeable modifications of the image which encode information, in barcodes as in EP1239413, EP1485863 or U.S. Pat. No. 6,398,117

WO2013012794 concerns systems and methods for providing document certification and authentication using 2D barcodes, in which said barcode having an overtly readable portion with a primary information forming a robust mark and a covertly readable barcode portion with a secondary information forming a fragile mark incorporated into redundant space of the overtly readable barcode portion. The fragile mark is embedded over the whole surface of the robust mark, another technique is also described in WO2008003964 wherein secondary information is embedded in a bar code, for example by varying the periphery of some of the bars or pixels by different amounts, WO2010034897 presents also embedded secondary information in a barcode. Notably, a Digital Authentication Code (DAC) that gets degraded such that the degradation has a certain error rate contained within pre-determined boundaries. DAC can therefore be used for protecting documents from illegal copies.

For example, all pixel values in the black cells of the 2D barcode may be modified by the digital authentication code. However, this may affect its readability. Furthermore, the DAC itself can be difficult to read as it covers a large surface and the precise synchronization which is required to read can be affected by geometric aberrations in the image capture.

2D barcodes can also be associated to fingerprint related methods in which the unique elements of each print, or groups of similar prints, are extracted and stored in a database. See for example U.S. Pat. No. 4,423,415, U.S. Pat. No. 4,785,290, U.S. Pat. No. 6,948,657 or U.S. Pat. No. 8,180,174.

In many of these documents, the secondary information is spread over the whole surface of the primary information, for instance as a watermark. These techniques have drawbacks, mainly listed as follows:

The information is in many cases covert to make it invisible to the counterfeiter who will not pay particular attention. Covert secondary information may be less secure than visible secondary information, because it is constrained to a weak signal to noise ratio to ensure imperceptibility. Consequently, the entropy is lower and it is easier for an informed counterfeiter to replicate accurately all the secondary information when making the copy.

Moreover, embedding hidden secondary information within the primary information may have an impact on the readability of the first information which is distorted by the presence of the secondary information.

In addition, the presence of secondary information such as DAC into a 2D barcode requires complex algorithms for embedding and decoding message contained in the secondary information, which makes the management of the authentication system cumbersome and less reliable, whereas 2D bar code containing only primary information are designed to be extremely quick and easy to decode.

The real drawback in conventional 2D barcodes is that the secondary information is more complicated to read than the primary information. Nowadays, the primary information can be easily read with a mobile phone equipped with a camera. Prior art techniques do not allow to automatically authenticate the 2D barcode with the secondary information without using a specific process or device.

When readable through optical means, the secondary information has been traditionally read with flatbed scanners, industrial cameras using a certain level of magnification, or a USB microscope (e.g. models from Veho™ or Dino-Lite™). More recently, mobile phones have been used but require an optical adapter in order to obtain the required magnification and image sharpness to read the details of the DAC that allows differentiating originals from copies. For example the mobile microscopes Handyscope™, or Dermlite DL1™, compatible with certain smartphones (e.g. certain iPhone™ and Samsung™ models) can be used.

This is a significant improvement over, using a flatbed scanner or USB microscope, as this allows inspectors or supply chain operators on the field to perform authentication. However, the need for an optical adapter remains a significant handicap to a more widespread use of these techniques. Indeed, the optical adapter is usually quite costly yet may be easily misplaced or lost, and thus needs to be always carried by the inspector. It makes deployment of reader solutions much more complex, as hundreds if not thousand of optical adapters need to be distributed and maintained. Obviously, using optical adapters is not feasible for a larger scale market use by consumers or retailers.

The new generation of mobile phones have impressive optical capabilities. An increasing number of mobile phones have the optical ability to capture small details, in particular the small details in DAC that allow to differentiate originals from copies.

Those new mobile phones have in principle the potential to be used to authenticate 2D barcodes using secondary information in a DAC. However, prior art techniques to use DAC as secondary information have a number of drawbacks that make it difficult to use a mobile phone without an optical adapter in a convenient way:

The secondary information needs to be decoded independently from the primary information, using a separate process. Algorithms to decode the secondary information are much more computationally intensive, and cannot be implemented in real-time in the mobile phone device. In several cases, a different reader is required.

The whole image of the scan must be sent to a server for authentication. This requires bandwidth, is costly and lengthens the time to obtain an authentication result.

The secondary information acquired in a scan cannot be validated as being usable for authentication in real-time by processing each frame. For example, the scan may not be in focus, it may contain artefacts that impede reading, or the positioning may be incorrect, in which it should not be sent to the server nor used for authentication. Therefore there is high risk that the user waits for an authentication result, only to receive the feedback that he needs to make another scan. Even worse, the authentication response might be wrong, for instance a scan not in focus might be interpreted as a copy. This is very inconvenient for users who may lose trust in the authentication system.

Users do not get feedback in real-time to guide them on how to scan, telling them for example whether the image is in focus or not, or whether they need to get closer of further away from the 2D barcode The user must press a button to take a picture in camera mode, instead of having automated scanning in video mode. Pressing a button may in itself bring the image to be out of focus. In any case, expecting the user to decide when the camera is correctly placed and the image will be acceptable for authentication is a high burden.

In sum, prior art techniques do not allow users to authenticate 2D barcode conveniently using their mobile device.

The objective of this invention is to address some or all the shortcomings of the prior art, and to propose a means to produce 2D barcodes which are secure against copying, while keeping good readability of primary information:

This invention also aims to provide a means to authenticate those barcodes such that the process of authentication is as simple as reading a 2D barcode with a mobile device.

SUMMARY OF THE INVENTION

According to the invention, various aims are achieved by means of a method for creating a 2D barcode, by means of a product embedding a 2D barcode, by means of a method of authentication of a 2D barcode, and by means of manufacturing a 2D barcode.

Disclosed herein is a method for creating a 2D barcode comprising:

embedding primary information that can be read by a 2D-barcode-reader in a primary information pattern, embedding secondary information that is made difficult to reproduce without alteration in a visible pattern, in which said pattern is embedded within said barcode in at least one area that does not contain any primary information, forming thereby a source 2D barcode.

Unless otherwise indicated in the present text, 2D barcode and all elements of 2D barcode such as primary information pattern and its primary information, visible pattern and its secondary information, data area, elementary cells, elementary sub-cells, signature, secret . . . concern source 2D barcode and all elements of such 2D barcode, but not original 2D barcode and all elements of such 2D barcode (i.e. for instance printed or screen displayed source 2D barcode) and not a non-original 2D barcode after reproduction of the original 2D barcode (i.e. for instance scanned or copied original 2D barcode).

In this context, "primary information" relates to information about a product or a service easily accessible to dedicated users, which presence is easy to detect and being easily recognized within a 2D barcode. Also, this primary information has a content which is easy to verify, a format which is conform to 2D barcode standards so as to be easily recognized as a certain 2D barcode type, and which can be easy to duplicate.

"Secondary information" relates to information which is aimed to validate authenticity (original character) of the 2D barcode and are more difficult to reproduce than primary information without alteration. Secondary information therefore does not necessarily need to contain any message about the product or document on which the 2D barcode is placed, but entirely focus on providing counterfeit detection means. Therefore, secondary information is not information like the primary information, in the sense that from the decoder perspective, no message is decoded, but a similarity with an original pattern is measured. Both primary information and secondary information are preferably in the form of pixels or groups of pixels. "Secondary information" may thus be in the form of a pattern of elementary sub-cells forming a so-called "fingerprint", whereby the elementary sub-cells are sufficiently small to prevent the reproduction of the pattern without introducing errors. The copying (scanning) of an originally printed pattern of elementary sub-cells representing the secondary information, followed by the visual reproduction (e.g. printing or representation on screen) thus leads to an alteration of the "fingerprint" that can be detected by the various means described herein (for instance by comparison of the fingerprint with a secondary information generation file or by comparison with an image corresponding to a scan or scans of original prints of the secondary information). As discussed herein, the secondary information may be randomly generated, in particular by use of a randomly or pseudo-randomly generated key that is kept secret, such that the secondary information contains a secret that prevents it from being re-generated by a counterfeiter. A counterfeiter only has access to the printed original which cannot be copied and reproduced without some detectable alteration.

According to an aspect of the invention, secondary information is not mixed with primary information but kept physically separated from primary information. Therefore, according to the invention since secondary information is formed by a visible separated pattern, located in one or several identified places within the 2D barcode, first information risks no reading alteration due to modification of the image when secondary information is also present. Also separated secondary information and concentration in specific areas means more reliable reading and further decoding steps due to lower risks of geometrical distortions or aberrations of the pattern containing secondary information. Secondary information being present in the 2D barcode, it replaces primary information portion(s), although not preventing the readability of primary information, as far as the proportion of surface of primary information replaced by secondary information stays within the boundaries of tolerance given by the error correction code.

Also, according to another aspect of the invention, secondary information is not covert, notably by not being embedded into and mixed with primary information and/or through a watermark and/or through an intentionally applied form of noise or any other unnoticeable modification of the image which encodes primary information. Secondary information is visible. Visible secondary information has higher entropy with respect to covert secondary information, which means more available data for coding secondary information for an identical surface extent used to represent secondary information in comparison with covert secondary information.

This situation allows using a high density of secondary information and therefore lowers the reproducibility reliability of secondary information with equipment such as scanners or copying machines. Indeed, the higher the density of visible secondary information, the harder it is to reproduce by the counterfeiter without introducing artefacts that will allow differentiating originals from copies.

The expression "difficult to reproduce without alteration" means to be affected by copying, i.e. that most copying machines, scanners, image capture devices or printers are not able to copy, capture or reproduce the 2D barcode without altering the visible pattern, which renders the secondary information systematically non readable or non-correctly readable after scanning or copying of the original printed visible pattern. For instance, the original printed visible pattern of the original 2D barcode contains fine details which cannot survive copying: authentication is based on scanning and analysing visible pattern details which are more numerous for original 2D-barcodes than for non-original 2D barcodes. Said otherwise, the expression "difficult to reproduce without alteration" means that the secondary information is deteriorated when copied and reproduced, such that it has lost features that are characteristic or original in the secondary information.

The secondary information may be formed by black and white elementary sub-cells having a size smaller than 30%, or even preferably smaller than 15%, or even preferably smaller than 5% with respect to elementary cells forming primary information.

The secondary information may be formed by black and white elementary sub-cells (notably pixels) having a largest dimension smaller than 0.2 mm, preferably smaller than 0.1 mm, preferably smaller than 50 µm in the original 2D barcode.

Advantageously, in said source 2D barcode and consequently in said original 2D barcode, said secondary information comprises a portion formed by black and white elementary sub-cells having an average black density (or level of grey) different from 50%±5% of black elementary sub-cells. This provision allows to maximize the information density in original prints and thereby to increase the degradation rate when reproduced, i.e. to maximize the information loss during reproduction of original 2D barcode and any subsequent reproduction (reproduction of first generation which forms a first generation non-original 2D barcode by copying an original 2D barcode, second generation which is a reproduction of said first generation non-original 2D barcode and forms a second generation non-original 2D barcode, and subsequent generations). According to such a provision, the average percentage of black pixels (also referred in the following as black density) in said visible pattern coding secondary information is predetermined and different from an average black density (level of grey) equal to or close to 50% commonly used in prior art 2D barcode and other secure graphics such as DACs. This feature is efficient to maximize the information density in original 2D barcode and thereby increase the level of degradation during reproduction of the 2D barcode with respect to a 2D barcode having an average percentage of black pixels equal to or close to 50%, i.e. this provision may significantly enhance difficulty to copy the visible pattern. For instance, said secondary information is entirely located in at least two different portions of said visible pattern, at least one portion having an average black density (or level of grey) different from 50%±5% of black elementary sub-cells. According to another possible provision, said secondary information is entirely located in at least two different portions of said visible pattern, each portion having different average black densities which are different from 50% of black elementary sub-cells and different from at least one other portion.

In this context "average black density" or "average level of grey" of a group of cells means proportion of black elementary cells (primary information), or elementary sub-cells (secondary information), notably group of pixel(s), among the group of elementary cells, or group of elementary sub-cells, defining a limited area containing several elementary cells, or elementary sub-cells (for instance nine, sixteen or twenty-five elementary cells, or elementary sub-cells). If the cells are not black or white, the average level of grey may weigh the intensity levels of the cells. In the present text, "black" elementary cells or "black" elementary sub-cells means elementary cells or elementary sub-cells which are either black or more generally dark or any colour different from white; "average dark density" and "average level of grey" meaning respectfully more generally "average colour density" and "average level of colour", i.e. average tone of the colour when colour is not black.

Advantageously, the visible pattern contains a signature that can be verified locally by a device directly connected to the barcode reader to check authenticity of the barcode. Therefore, in the present text, a "signature" is secondary information that is locally controlled, forming thereby secondary information of first security level. Such a signature constitutes a simple way to verify that the 2D barcode is an original one by comparing the decoded signature of the 2D barcode to be checked with a reference (signature key) that may be locally available, for example in a smartphone which is used as barcode reader or any other device used as barcode reader or containing a barcode reader, in particular a mobile device, directly connected to the barcode reader, to give an indication about the presence of the right signature or a wrong signature on the 2D barcode, thereby giving an indication about the original character or the non-original character (copy) of the 2D bar-code. For instance a pseudo randomly generated first key K1 (or "signature key") is used for all 2D-barcodes and is present in or available to the mobile device: the reconstitution of source signature is made preferably using first key K1 and part of 2D code message, i.e. primary information, (for instance unique ID present as portion of the primary information pattern) through a first algorithm present in the mobile device: Therefore, the first security level authentication check is implemented by comparison between signature of the 2D barcode to be checked and said source signature (said "comparison" being for example an image similarity calculation producing a score and a comparison of that score to a threshold). The first security authentication check can be advantageous when the authentication device is not connected to the Internet. Another significant advantage of the signature is the possibility to verify locally whether the scan has appropriate image quality by performing measurement on the signature. For example, if for consecutive frames the measurement is stable and consistent, this can be an indication that those frames are usable for authentication and can be sent to a remote server for full authentication.

Advantageously, to enhance the security level of authentication, in addition or alternative to said signature, said visible pattern further contains a secret which authenticity can be verified only by a remote device. Therefore, in the present text, a "secret" is secondary information that is only remotely controlled, forming thereby secondary information of second security level (second security level being of higher level than first security level). Such a secret forms an additional security element, formed by an image portion of the visible pattern, i.e. a unique pattern (unique noise pattern), here randomly generated, which is compared with a reference (secret key) that may be only available in a remote equipment (for instance the secret key is part of a database present in a remote server). This situation requiring an information exchange between the 2D barcode-reader and the remote server, only people having access to the remote server can use this remote authentication procedure. Also, having the secret key recorded in a remote server allows using hidden and hardly accessible information within the secret. For instance, the secret key is part of a remotely stored list of original secrets. For instance second keys (or "secret keys") K2, K2' . . . , different for each barcode or for each series of 2D-barcodes, are present only in the remote server (secure database), they are preferably generated truly randomly (but also can be pseudo randomly generated or partially truly randomly/partially pseudo randomly generated). The reconstitution of source secret is made from second key K2 only present in the remote server (through a second algorithm (optionally, said reconstitution of source secret also uses a part of 2D code message, i.e. primary information (for instance unique ID)). Said second algorithm can be present anywhere including said mobile device or said remote server. Therefore, the second security level authentication check is implemented by comparison between the secret of the 2D barcode to be checked and said source secret. As an alternative to the use of said second key K2, the source secret, i.e. the pattern, is stored in the remote server, so that a comparison is directly done between said source secret and said secret 426 of the 2D barcode to be checked. Said "comparison" being for example an image similarity calculation producing a score and a comparison of that score to a threshold. It may be noted that the signature can be checked in further details and with more accuracy in the remote device, by comparison to more reference information such as reference scans of original prints and thresholds based thereon that are stored in the remote device.

Advantageously, said secret can be reconstituted using a secret key (K2) present only in said remote device. Such secret is a second data portion which forms an additional portion of the fingerprint (visible pattern), and which enhances security level of authentication of 2D barcode:

pseudo-randomly generated data of the second data portion form data which can only be retrieved with a complex routine (program operations). Whenever for instance such second data portion can be retrieved from at least primary information, secondary information is only correctly accessible when primary information has beforehand correctly been decoded. Also, according to another more secure alternative, when second data portion can only be retrieved from both primary information and a randomly generated first data portion of said signature, secondary information is only correctly accessible when both primary information and first data portion, i.e. signature, have beforehand correctly been decoded or matched to a source.

In addition, said visible pattern may contain only a signature, only a secret or both a signature and a secret. The zones where the signature and the secret are coded may be physically separated or not. The portion of this visible pattern (secondary information) formed by a signature, a secret or both a signature and a secret, can be considered technically as a fingerprint.

BRIEF DESCRIPTION OF THE DRAWINGS

The invention will be better understood with the aid of the description of embodiments given by way of example and illustrated by the figures, in which:

FIG. 8 is a flowchart illustrating an exemplary embodiment of a method of authentication according to the invention.

FIG. 9 is a schematic view of a source 2D barcode according to an embodiment of the invention, in an enlarged scale for clarity purposes;

FIG. 10a is a schematic view of a source 2D barcode according to another embodiment of the invention, in an enlarged scale for clarity purposes, and FIG. 10b is an enlarged view of the visible pattern of secondary information of the 2D barcode of FIG. 10a;

DETAILED DESCRIPTION OF EMBODIMENTS OF THE INVENTION

Figure 1:
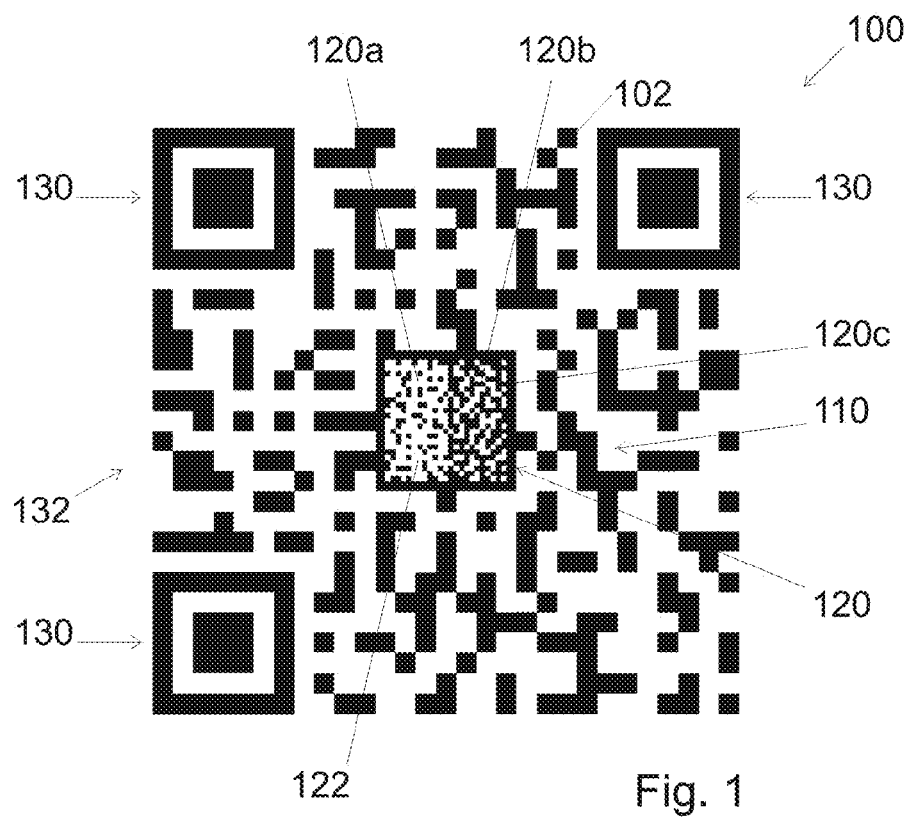
FIGS. 1 to 6 show schematic views of different embodiments of source QR barcodes forming 2D barcodes according to the invention, in an enlarged scale used for clarity purposes.

FIG. 1 shows a first example of a QR code forming a first embodiment for a 2D barcode 100 according to the invention. This 2D barcode 100 is formed by a symbol having a general square shape and comprising usual patterns of a QR code, namely three position detection pattern 130 located at three of the four corners of the QR code, and a data area 132. This data area 132 first includes primary information pattern 110 formed by a chosen arrangement of elementary cells 102, being here sets of 10×10 pixels, and shown in a non-limitative way as squares. These elementary cells 102 are coding primary information and have a size allowing most copying machines to copy the primary information pattern 110 without altering it or with such a little alteration that this pattern can be decoded correctly and there is no alteration to the information stored in the cells. Typical but non limitative size of elementary cells 102 coding primary information in the primary information pattern 110 of original 2D barcode 100 is ranging from 5×5 pixels to 90×90 pixels, for instance from 8×8 pixels to 12×12 pixels. Depending on the printing resolution (which can be 600 dots per inch, 2400 dots per inch, or any other value depending on the printing device) this can correspond to typical but non limitative size (largest dimension) of elementary cells 102 of original 2D barcode 100 ranging from 0.05 mm to 3 mm, notably from 0.1 to 2 mm, preferably from 0.2 to 1 mm, and preferably from 0.3 to 0.5 mm.

According to the invention, this 2D barcode 100 also contains, within the square data area 132 and separately from the primary information pattern 110, a visible pattern 120 with secondary information. In this first embodiment shown in FIG. 1, this visible pattern 120 is a square located at a center position within the primary information pattern 110, forming thereby a separated block or an island embedded within the primary information pattern 110. More generally this visible pattern 120 could have a rectangular shape, or other geometrical shape in order to be easily recognized and cropped from the primary information pattern 110, in order to be decoded preferably separately from the primary information of the primary information pattern 110.

As can be seen from FIG. 1, this visible pattern 120 is formed by black and white elementary sub-cells 122 which have been also represented as a chosen arrangement of pixels (shown in a non-limitative way as squares) which are smaller than elementary cells 102 forming primary information pattern 110 and which code secondary information. The elementary sub-cells 122 size allow most copying machines to copy the secondary information pattern 110 with a sufficiently significant alteration to impede a later correct decoding of this visible pattern 120. An important feature of this invention is not how much information there is in the fingerprint and more generally in the original visible pattern 120 before printing or copying, but how much information there is after printing or copying in the visible pattern 120. For the same visible pattern 120, the effects of printing or copying and the density of information in the printed or copied visible pattern 120 will depend on the properties of printing or copying (type of printer or copying machine, type of paper, ink, and specific color density requirements for the printing or copying job). Typical but non limitative size of elementary sub-cells 122 coding secondary information in the visible pattern 120 is ranging from 1×1 pixel to 5×5 pixels, notably from 1×1 pixel to 3×3 pixels, and preferably is 1×1 pixel or 2×2 pixels. This can correspond to typical but non limitative size (largest dimension) of elementary sub-cells 122 of original 2D barcode 100 ranging from 5 µm (micrometers) to 300 µm, notably from 10 µm to 200 µm, preferably notably from 20 µm to 100 µm, and preferably notably from 30 to 50 µm. For instance, for a printer resolution of 600 ppi (pixels per inch), a typical size for original 2D barcode 100 is about 1.11 cm edge length square, with 33×33 elementary cells 102 having each a size of about 0.34 mm, and with a visible pattern of 8×8 elementary sub-cells 122 being each formed by a pixel having a size of about 40 µm (micrometers).

The visible pattern 120 of secondary information may, in embodiments (see FIGS. 1, 9, 10a), advantageously comprise a border 121 that improves the retrieval and cropping of the secondary information. In an advantageous embodiments (see FIGS. 9, 10a), the border 121 may comprise a black border 121 and therearound a white border or space separating the secondary information visible pattern 120 from the primary barcode 110 to enable quick and easy identification of the visible pattern and reduce read errors.

As a first preferred variant, this visible pattern 120 is not exactly located at a center position, but is overlapping the centre of said symbol which materialises this 2D barcode 100: in such a non-shown configuration, this visible pattern 120 is moved lightly downward, upward, on the left or on the right with respect to the exact centered location shown in FIG. 1. Placing the visible pattern 120 overlapping the centre of said symbol which materialises this 2D barcode 100 can be advantageous since when the 2D barcode is captured with a barcode reader or scanning device such as a mobile phone, the centre of the 2D barcode is often close to the centre of the captured image, which tends to be more in focus. Therefore the visible pattern 120 will tend to be close to the centre of the scanned image, which typically has less geometric aberration and is more in focus.

As another variant this visible pattern 120 is not located at or covering a center position but is placed anywhere else within the limit of said square data area 132, or more generally within the limit of said symbol forming said 2D barcode 100.

Also, this visible pattern 120 is shown in FIG. 1 as a single part formed by two adjacent portions 120*a* and 120*b*, each of which has a different average black density or average level of grey. These two portions 120*a* and 120*b* of FIG. 1 are represented as rectangle with equal size and shape but could be of different sizes and/or shapes. In FIG. 1, the left portion 120*a* is represented with a low average black density or average level of grey of about 20% of black elementary sub-cells 122 whereas the right portion 120*b* is represented with a high average black density or average level of grey of about 80% of black elementary sub-cells 122, whereby the global average level of grey of this visible pattern 120 is around 50% of black elementary sub-cells 122. Black densities of 20% and 80% have been used in FIG. 1 for visibility reasons on the drawings but other black density values different from 50%±5% can be used for one or several portions of the visible pattern: As very likely black density values on can use a low average black density of about 40% of black elementary sub-cells 122 and a high average black density of about 60% of black elementary sub-cells 122. More generally, a low average black density different from 0%, from 1% to 45% of black elementary sub-cells 122 is associated with a high average black density different from 100%, from 55 to 99% of black elementary sub-cells 122. Using such an arrangement or even a similar arrangement with more than two portions, and preferably an even numbers of portions, forming said visible pattern 120 constitutes a preferred provision. One average black density and preferably two or more than two average black densities different from 50%±5% of black elementary sub-cells forming the secondary information maximize the information density in original 2D bar-code since it covers a large panels of optimal printing properties (such as dot gain) which themselves can vary during a batch of prints. A higher information density makes it harder to copy as there more information to replicate.

There are situations where it is not possible to know in advance what will be the optimal average black density, for example if the printer could not be tested in advance. There are also situations where the optimal fingerprint density may vary during printing. This may happen for instance if ink density, or viscosity, varies during printing. For certain types of printing, for instance rotogravure, the same fingerprint (visible pattern) may be used over a long period of time—as long as the cylinder is used in the application, i.e. several months. Clearly, the print properties are likely to evolve as the cylinder wears out. To cope with such effects, the visible pattern is preferably composed of different areas with different black densities. Then, the determination of authenticity can be made by using the areas that were printed in a way that is most favourable to their ability to detect copies. As a preferred embodiment, said visible pattern 120 is formed by a first portion having a first average black density or first average level of grey and a second portion having a second average black density or second average level of grey which is different from the first average black density, both first and second average black densities being different from 50%±5% of black elementary sub-cells. As a possibility, the mean between said first average black density and second average black density being about 50% of black elementary sub-cells 122. As a non-shown alternative, this visible pattern 120 is formed by two or more separated parts distributed in a non-adjacent relative position, namely in different locations of said symbol which materialises this 2D barcode 100, one of these part being preferably placed overlapping the center position within the primary information pattern 110. These two or more separated parts could have same or different average levels of grey between them, preferably with a black density or level of grey clearly different from 50% of black elementary sub-cells/pixels, namely lower than 45% of black elementary cells or greater than 55% of black elementary sub-cells, so as to maximize the information density in original 2D bar-code and therefore increase the degradation rate when this 2D barcode 100 is reproduced by a copying machine.

The visible pattern 120 shown in FIG. 1 is defined also by a third portion 120*c* forming the boundary of the visible pattern 120 and shown in FIG. 1 as a continuous line of black elementary sub-cells 122 aligned in a double row forming a closed square loop. Such a third portion is useful to help the recognition of the visible pattern 120 by the barcode-reader but can be omitted.

This modified 2D barcode 100 shown in FIG. 1 is a preferred form of a modified QR-code type with a symbol coded with 29×29 elementary cells 102, with a visible pattern 120 coding secondary information with a zone formed by 9×9 elementary cells 102. As a non-shown alternative, the visible pattern 120 codes secondary information with zone formed by 10×10 elementary cells 102 or by 8×8 elementary cells 102 Such a situation is a good compromise between good readability of the QR code, taking into account the error correction level acceptable for possible damage when reading the secondary information, and the decoding limit of the area used for secondary information.

As a purely exemplary representation, in FIG. 1 the visible pattern 120 coding secondary information contains 27×27 of elementary sub-cell 122. Therefore each elementary cell 102 of the primary information is replaced by 3×3, i.e. 9 elementary sub-cells 122, each elementary sub-cell 122 being a pixel.

Figure 2:
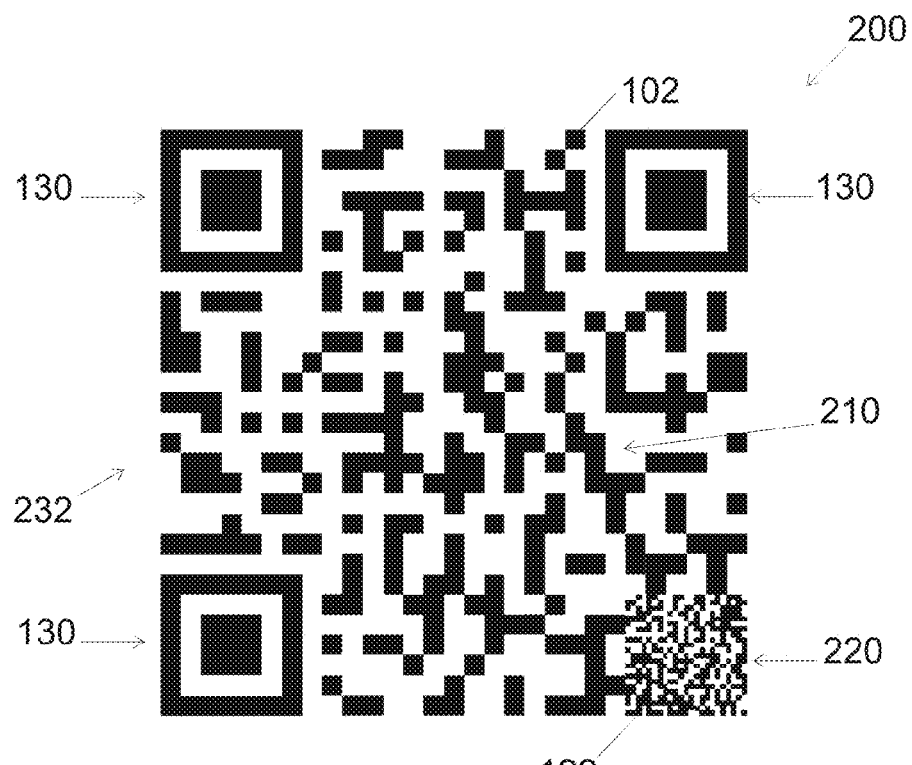

FIG. 2 shows a second example of a modified QR code forming a second embodiment for a 2D barcode 200 according to the invention. The reference numbers used to describe this 2D barcode 200 are the same as for identical parts already shown in FIG. 1 and are increased by 100 for similar parts with respect to those of FIG. 1.

Here the symbol forming the modified 2D barcode 200 is formed by a square data area 232 containing three position detection patterns 130*a*, primary information pattern 210, and a visible pattern 220. In this second embodiment, secondary information is embedded by a visible pattern 220 which is not located in the center area of the square data area 232 but is located at the corner of the square data area 232 which does not contain a position detection pattern 130 (here at lower right corner). This situation does not disturb the position detection function of the three position detection patterns 130 since they stay at the same place and have not been modified. However, let us note that QR Codes of Version 2 and above contain a fourth, smaller position detection pattern in the bottom right part of the code, which may be affected by the secondary information. Also, in this second embodiment, visible pattern 220 contains secondary information coded with medium average black density or medium average level of grey, i.e. a unique portion having an average black density or average level of grey of about 50% of black elementary sub-cells 122, i.e. preferably having an average black density or average level of grey comprised between 45 and 55% of black elementary sub-cells 122.

As a non-shown variant of this second embodiment, the 2D barcode 200 is formed by a square data area 232 containing three position detection patterns 130 and, apart from these position detection patterns 130, the square data area 232 contains only primary information pattern 210. It corresponds to the situation where secondary information is embedded by a visible pattern 220 located within one of the position detection pattern 130 forming thereby a modified position detection pattern containing the visible pattern 220. This situation does not disturb the position detection function of the modified position detection pattern 230 since it stays at the same place and has the same square shape, the same size and is also delimited by a continuous black square line as the non-modified position detection patterns 130. In this non-shown variant of this second embodiment the other two position detection patterns 130 are not modified but can also be modified to contain a further visible pattern 220.

Figure 3:
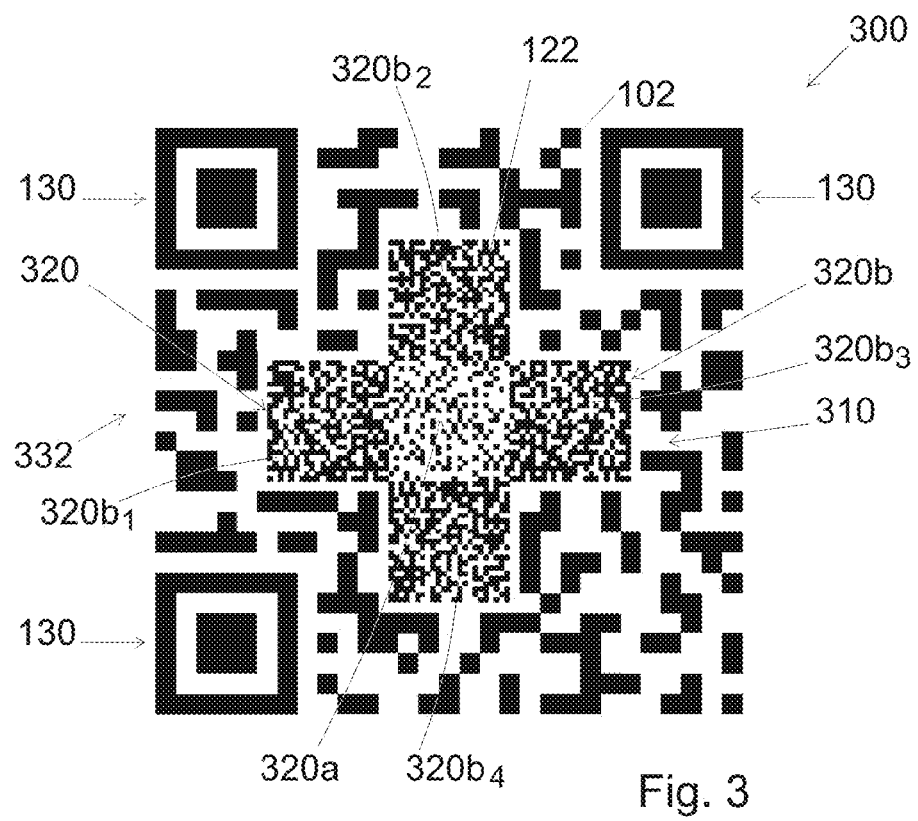

FIG. 3 shows a third example of a modified QR code forming a third embodiment for a 2D barcode 300 according to the invention. The reference numbers used to describe this 2D barcode 300 are the same as for identical parts already shown in FIG. 1 and are increased by 200 for similar parts with respect of those of FIG. 1.

As for 2D barcode 100 of FIG. 1, the 2D barcode 300 of FIG. 3 contains a visible pattern 320 with secondary information which is centered within the primary information pattern 310, which means matching between the geometrical center of the visible pattern 320 and the geometrical center of the primary information pattern 310. In this third embodiment, the visible pattern 320 is formed by a square first portion 320a having a first low average black density or first low average level of grey and being centrally located inside the visible pattern 320, and a second portion 320b with a second high average black density or second high average level of grey and surrounding said square first portion 320a. This second portion 320b is divided into four square sub-parts 320b₁, 320b₂, 320b₃ and 320b₄ arranged in a Swiss cross, each of which having a lateral side edging a different a lateral side of the square first portion 320a. As for other embodiments, data area 332 contains three position detection patterns 130, the primary information pattern 310 and the visible pattern 320 containing the secondary information separately from the primary information. The visible pattern 320 is illustrated having a size covering a surface larger than 10, 15 or even 20% of the total surface of the square data area 232 but according to the invention a more limited size with respect to the total surface of the data area 232 is preferred for the visible pattern 320, namely a visible pattern 320 covering less than 20% and preferably less than 13% of the total surface of the square data area 232. Such a provision allows that inserting the secondary information does not affect readability of the primary information of the QR code. The secondary information may be in any desired shape representing for instance a logo, trademark or other fantasy shapes desired by the producer.

Figure 4:
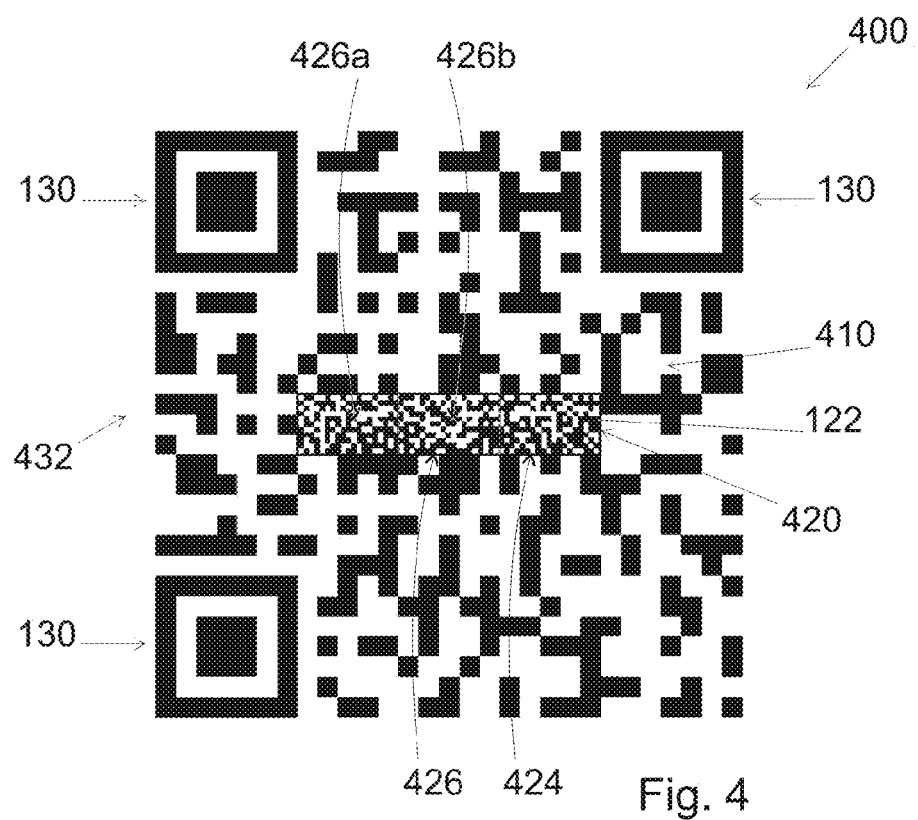

FIG. 4 shows a fourth example of a modified QR code forming a fourth embodiment for a 2D barcode 400 according to the invention. The reference numbers used to describe this 2D barcode 400 are the same as for identical parts already shown in FIG. 1 and are increased by 300 for similar parts with respect of those of FIG. 1.

Also here the 2D barcode 400 of FIG. 4 contains a visible pattern 420 with secondary information which overlaps the center of the primary information pattern 410 and of the data area 432, while being separated from primary information. Visible pattern 420 of the fourth embodiment is a rectangle divided into separated zones encoding different types of information. More precisely, visible pattern 420 is divided into a zone 424 that contains a signature (right portion of visible pattern 420) and a zone 426 that contains a secret (left portion of visible pattern 420). Also, in this embodiment, the secret is contained in a zone 426 which is divided into a first data portion 426a (left portion of secret zone 426) and a second data portion 426b (right portion of secret zone 426) having two different densities, such as 40% and 60% black densities for the sub-cells 122 for these two different portions of secret 426.

As described in accordance with these first to fourth examples of a QR code forming first to fourth embodiments for a 2D barcode according to the invention, it is advantageous to entirely replace an area of the primary information of the 2D barcode with the secondary information represented by the visible pattern, as secondary information limited to an homogeneous zone within primary information will be more easily and reliably processed.

Figure 5:
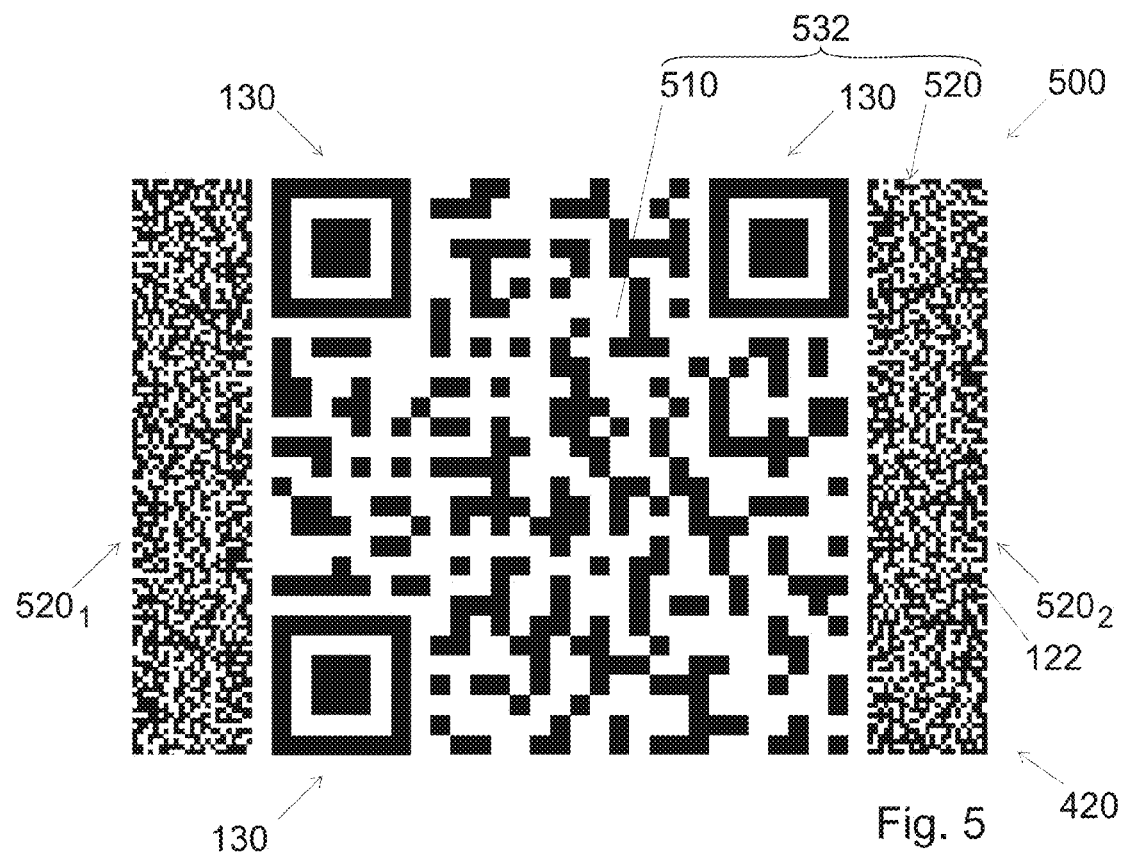

FIG. 5 shows a fifth example of a modified QR code forming a fifth embodiment for a 2D barcode 200 according to the invention. The reference numbers used to describe this 2D barcode 500 are the same as for identical parts already shown in FIG. 1 and are increased by 400 for similar parts with respect of those of FIG. 1.

The main difference with already described first to fourth embodiments lies in the fact that for fifth (and sixth) embodiment the visible pattern 520, containing secondary information coded with elementary sub-cells 122 (small pixels), is not placed within the boundary of the primary information pattern 510 but outside the limit of said primary information pattern 510, still inside the symbol forming the modified QR code and delimited by the data area 532. The visible pattern 520 of this fifth embodiment is formed by two rectangles: a first portion 520₁ of the visible pattern 520 extends along the whole left edge of the square primary information pattern 510 and a second portion 520₂ of the visible pattern 520 extends along the whole right edge of the square primary information pattern 510. The data area 532 has therefore in this specific case a rectangular shape whose length extends between the two portions 520₁ and 520₂. The content and repartition of data between the two portions 520₁ and 520₂ visible pattern 520 can be varied, having a signature zone and/or a secret zone with only first data portion 520₁ or only second data portion 520₂ or both first data portion 520₁ and second data portion 520₂. Here, this visible pattern 520 has a medium average black density or medium average level of grey, namely an average black density or average level of grey of about 50% of black elementary sub-cells 122, i.e. preferably having an average black density or average level of grey comprised between 45 and 55% of black elementary sub-cells 122. In FIG. 5, the visible pattern 520 has a medium black density or level of grey in the whole surface of the two portions 520₁ and 520₂ but a different average black density or level of grey and/or different repartition of the average black density is possible.

Figure 6:
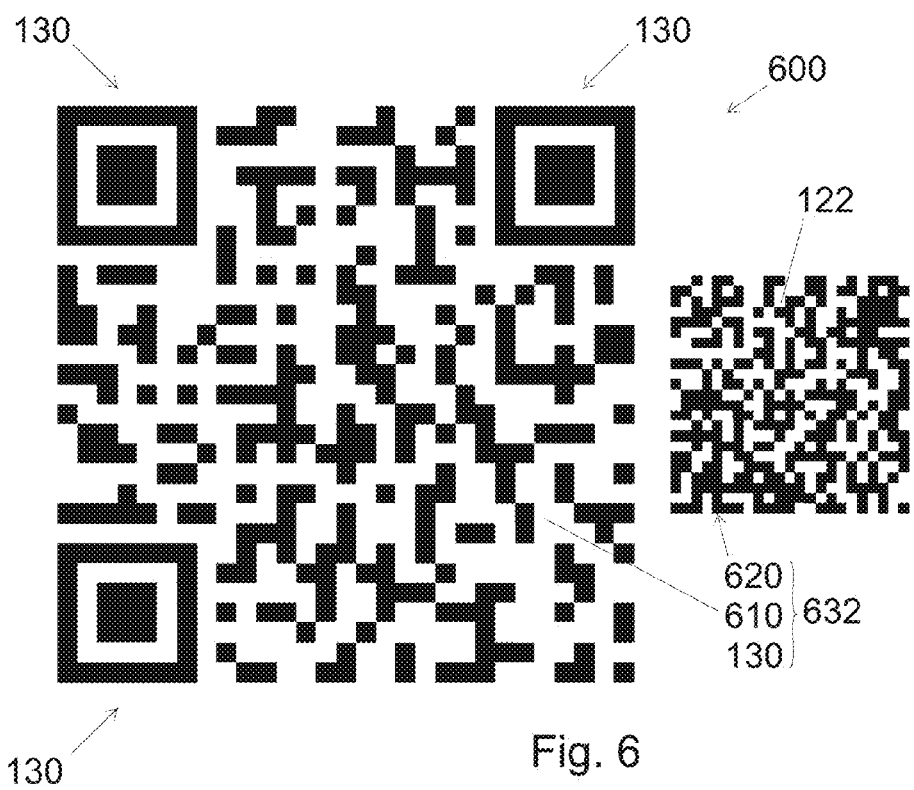

FIG. 6 shows a sixth example of a modified QR code forming a sixth embodiment for a 2D barcode 600 according to the invention. The reference numbers used to describe this 2D barcode 600 are the same as for identical parts already shown in FIG. 1 and are increased by 500 for similar parts with respect of those of FIG. 1. Here, the the visible pattern 620 of this sixth embodiment is formed by one only square located at the border of the middle of on (right) side of the square primary information pattern 610. The data area 632 has therefore in this specific case a polygonal shape made from a primary information pattern 610 (primary information pattern 610) and a smaller square (visible pattern 620) placed alongside said primary information pattern 610.

When the visible pattern containing secondary information is located outside the area of the primary information pattern, it can be advantageous to print it at a different time, or with a different printing machine. For example, secondary information is first, printed with offset printing, then primary information is printed with inkjet printing. When the two information pattern are printed with different printing machines, it is often the case, but not necessarily the case, that the secondary information pattern is printed with a static printing process (offset, flexography, rotogravure, etc.) and therefore does not change for every print or product. There are a number of situations where this is nevertheless advantageous: for example if the means to print the primary information pattern is of insufficient quality or resolution to print the secondary information pattern, or if there are technical constraints on data transfer, security, pre-existing application for marking primary information which cannot be modified, etc. In such cases, it may be advantageous to use the same generation keys for the secondary information pattern, for a batch or set of codes which have the same secondary information pattern.

On the figures, primary information patterns 610, 510 and 210 are exactly the same in shape, pixel size, and pixel arrangement but this is only as an exemplary illustration since all shapes, pixel sizes, and pixel arrangements are possible for primary information patterns.

An example for application of fifth embodiment or sixth embodiment is the situation where only a small 2D barcode (for example a 4×4 mm large QR Code) is sufficient or preferred. In that case, a visible pattern, and notably a fingerprint zone that uses approximately 10-12% of the surface may be too small to ensure reliable distinction of original prints and copies. The approach is to put the visible pattern outside the square defined by the primary information pattern and forming the QR Code format standard: in FIG. 5 the visible pattern 520 is located along two opposite sides of the primary information pattern 510 and in FIG. 6 the visible pattern 620 is located along a portion of one (right) side of the primary information pattern 510. Other non-visible shapes and arrangements are possible for the visible pattern as an "all around" situation where the visible pattern forms a closed loop encircling the primary information pattern (to keep the square size), or on or along only one side (e.g. as a square visible pattern which is the same size as the primary information pattern defining an usual QR Code).

As an example, a method for creating secure QR codes associates a unique noise pattern, called a fingerprint (secondary information contained in both the signature 424 and the secret 426 zones of visible pattern 420), to a specific QR Code (primary information contained in the primary information pattern 410) and/or to a unique ID (present as portion of the primary information pattern 410). The QR code can in principle contain an arbitrary message. For example the QR code might contain a unique link to a web address, which can be reached if a user scans the QR code with an arbitrary barcode reader. For example http://www.example.com/135dgk86f37gks9 where http://www.example.com/ is the prefix and 135dgk86f37gks9 is a unique ID (more generally it could be a unique ID and encrypted information). This message and/or the unique ID allows to retrieve information related to this QR code, and in particular information that relates to the fingerprint, i.e. notably portion of the secondary information contained in the signature zone 424 of visible pattern 420, and which can be used for authentication of the QR code.

The unique ID (portion of the primary information) can be generated with a true random number generator. In addition important parameters (score threshold—predetermined signature threshold and/or predetermined secret threshold—, version number of the fingerprint (secondary information contained in the signature zone 424 and/or secret zone 426 of visible pattern 420), location and size of the visible pattern 420 relatively to the QR code (primary information), second keys K2, K2' used to generate part of the visible pattern 420) can be encrypted and appended to the unique ID. These information can be decoded on a remote device without connexion to the server, allowing for partial local authentication as well as validation of image quality before sending to a remote server for complete, remote authentication Using primary information from the 2D Code (unique ID) allows to make a secondary information (notably a secret) that will change for each 2D code message even if the same key K2 is used. The secret can also be generated with a true random number generator. In that case, the whole secret is stored in a secure database in association to the primary information of the 2D code (or any unique ID formed by information derived from it). As will be further explained, a related approach is to store scans of the 2D barcode in the secure database.

True random number generators (TRNG) and pseudo random number generators (PRNG) for generating the secondary information, and especially the secret, have each their advantages and disadvantages. Clearly one advantage of PRNG, is that the secret key can be more easily shared between the secure server, and other servers or devices. For example, a mobile device equipped with the second key K2 will have the ability to generate locally the secret, and could use the locally generated secret to make an authenticity check without connecting to the secure server. This allows a faster, even real-time response to the user, and allows an authenticity check even when connection with the secure server is not possible.

However, a known disadvantage is that all the information needed to generate valid secrets is stored in a key, and if that information is stored in multiple servers or devices, there are increased risks that a counterfeiter gains access to the key by compromising of the devices.

A compromise between security and usability is to have part of the visible pattern forming said secret generated purely randomly, and another part generated pseudo-randomly. Therefore, one authenticity check can be made with the pseudo-random part of the secret, and one authenticity check with the purely random part. The second key K2 or keys K2, K2' used to generate the pseudo-random parts can be made available to authorized servers or devices, which can use them to make an authenticity check without connecting to the database. And even if those second keys K2, K2' get compromised, the purely random part of the secret remains secure, and would allow to detect any fraud where the pseudo-random part is compromised.

Another way to implement this compromise, is to use a second key K2 to generate one data portion that is used only for this particular 2D barcode and associated secret, and can only be retrieved from a database; while the other second key K2' used to generate the other data portion is shared by a number of 2D barcodes and associated secret, and this other second key K2' can be stored on remote devices.

After creation of a source 2D barcode, this 2D-barcode is used on a product (such as document, label, consuming goods or package) or a batch of products after printing, forming thereby an original 2D-barcode embedding on a product as defined in claim 9. If this original 2D-barcode is reproduced (copied or scanned) for unauthorized use, this fake or non-original 2D-barcode is detected according to the method of authenticating of a 2D barcode as defined below through failure in a authentication result. If said authentication result is successful, said method of authenticating allows to know that the 2D-barcode embedded on a product is indeed an original 2D-barcode.

According to an embodiment, a method of authenticating of a 2D barcode on a product comprises:

reading with a 2D barcode-reader a 2D-barcode (400), identifying a visible pattern (420) and identifying within said secondary information said signature (424) thereby forming a detected signature, comparing said detected signature to a signature key and determining as a result of the comparison a signature similarity score comparing said signature similarity score to a predetermined signature threshold, and establishing an authentication signature result being success if said result is equal to or more than said predetermined signature threshold or being failure if said result is less than said predetermined signature threshold.

According to an embodiment, the 2D barcode-reader may be part of a mobile device (20), in particular a smartphone, and wherein said signature key is stored on said mobile device (20) which implements the comparison step between said detected signature and said signature key.

According to another embodiment, a method of authenticating of a 2D barcode (400) on a product may comprise:

reading with a 2D barcode-reader said 2D-barcode (400), identifying said visible pattern (420) and identifying within said secondary information said secret (426) thereby forming a detected secret, comparing said detected secret to a secret key of a source 2D bar-code and determining as a result of the comparison as a secret similarity score comparing said secret similarity score to a predetermined secret threshold, and establishing an authentication secret result being success if said result is equal to or more than said predetermined secret threshold or being failure if said result is less than said predetermined secret threshold.

The 2D barcode-reader may be part of a mobile device (20), in particular a smartphone, which is connected to a remote device (30), wherein said secret key of said source 2D bar-code is stored on said remote device (30) which implements the comparison step between said detected secret and said secret key, and wherein said method further comprises sending back said authentication secret result to a said mobile device (20).

Figure 7:
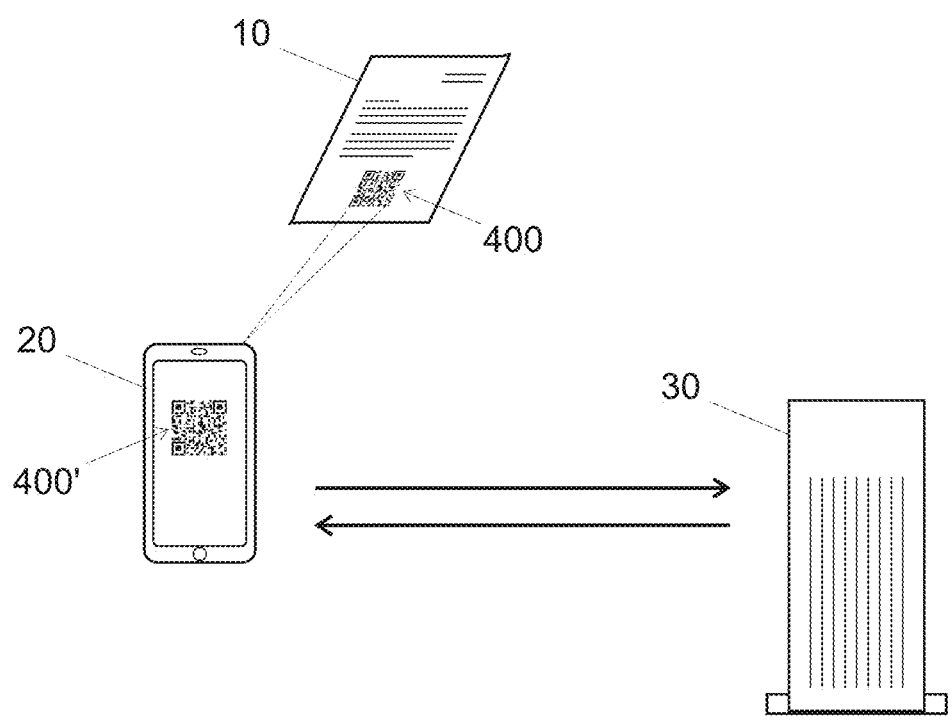
FIG. 7 is an illustration of a method of authentication of a 2D barcode according to the invention.

FIG. 7 serves as an illustration of methods of authentication of a 2D barcode according to the invention, for controlling the original character of a 2D barcode. Considering a document 10 (for instance a warranty document for any equipment recently bought), with a 2D barcode 400 according to the present invention, being an original 2D-barcode or being a non-original 2D-barcode, a mobile device 20 with an integrated 2D barcode-reader (here a smartphone), and a remote server 30.

These methods of authentication for a 2D barcode with a visible pattern comprising a signature zone are described by taking into account the 2D barcode 400 of FIG. 4 with a visible pattern 420 having said signature zone 424 and said secret zone 426 forming together a fingerprint.

Now is described a first method of authentication that can be used for any a 2D barcode with a visible pattern comprising at least said signature and constituting a local authentication method of a 2D barcode for a low security check. This first method of authentication of a 2D barcode is performed to detect if a product has an original 2D barcode or a non-original 2D barcode, and comprises the following steps:

reading (scanning) with said 2D barcode-reader of the mobile device 20 said 2D-barcode 400, forming thereby a picture 400' (scanned 2D-barcode) of said 2D-barcode 400, Decoding primary information contained in primary information pattern 410 (this primary information can contain indication about geometric localisation of the visible pattern containing secondary information which contains relevant information for cropping and authenticating), locating within said picture 400' said visible pattern 420 (by cropping) and identifying, within said secondary information said signature (in FIG. 4 zone 424) with said mobile device 20 thereby forming a detected signature, comparing (for instance by image correlation function) said detected signature to a signature key (or signature) of a source 2D bar-code available in said mobile device 20 (hardcoded in the 2D barcode message of the primary information pattern 410 or pre-downloaded from a server) and determining as a result of the comparison a signature similarity score, comparing said signature similarity score to a predetermined signature threshold (that can for example be inserted in the primary information forming the QR Code message, such that authentication can be performed in the mobile device 20 without any connexion with the server 30, alternatively a list of signature thresholds for each signature may have been downloaded previously)

establishing an authentication signature result being success (original 2D barcode) if said result is equal to or more than said predetermined signature threshold or being failure (copy and therefore non-original 2D barcode) if said result is less than said predetermined signature threshold. These steps can be implemented several times for the same or different scans of a presumed same original 2D barcode, in order to help for determining the predetermined signature threshold which depends on the typical signature similarity score distribution for original 2D barcode which can serve as reference.

Alternatively to the option of comparing said detected signature to the signature key of said source 2D barcode (situation with a first predetermined signature threshold), another option consists in comparing said detected signature to the signature key of series of previous scans of original 2D barcodes and which is adapted along the time with new scans of other original 2D barcodes (situation with a second predetermined signature threshold different from said first predetermined signature threshold).

In option, when decoding primary information, extracting unique ID and encrypted information allowing to verify whether 2D barcode contains a fingerprint (signature and/or secret of secondary information in a visible pattern), and associated parameters useful to authenticate fingerprint (signature and/or secret).

The approach where the predetermined signature threshold is stored in the 2D barcode constitutes a first-level security check with low reliability: if, say, the production was of a lower quality than usual, then the probability of false alarm may be increased, unless the hardcoded threshold is set to an intentionally low value to avoid false alarm, which at the same time makes it potentially easier for copies to defeat the system. The predetermined signature threshold can be adjusted to compensate from imperfections of the scan. Those imperfections can be generic (relative quality of the barcode-reader) or depend on a particular scan: for instance the QR code may have an expected size in pixels, or relative size with resect to the image size, in the scan if it is captured with the mobile device at a recommended approximate distance (say, at 8 cm). If the mobile device is further way (say 12 cm), the QR code will be smaller, and this low scanning resolution may affect the signature similarity score level. The predetermined signature threshold can be automatically adjusted to compensate for a suboptimal distance to the capturing device. An alternative method is to have the mobile device warn the user that the QR code in not at the optimal reading distance and, for example, to suggest him to come closer.

In one variant of said first method of authentication, when the signature similarity score is under the predetermined signature threshold, some additional checks are made: for example one or more consecutive readings under the predetermined signature threshold may bring further confirmation that the document is a copy; measure of sharpness and other distortions which affect measurement (e.g. a high perspective transform, low ambient light) may also indicate that another scan should be taken before taking a final decision.

In a variant of said first method of authentication, said mobile device reconstitutes said signature key of said source 2D barcode by a first algorithm present in the mobile device using a first key K1 (preferably pseudo randomly generated) available in the mobile device and from part of said primary information (portion of the primary information pattern 410 forming a unique ID).

While instant verification is highly desirable, security should not be compromised. Therefore, when network connectivity is available, at least part of the authentication should occur on the secure server 30, to detect eventual fraud and to make a more complete check.

Now is described a second method of authentication that can be used for any 2D barcode with a visible pattern comprising at least said secret zone and constituting a remote authentication of a 2D barcode for a higher security check. This second method of authentication, comprises— reading (scanning) with said 2D barcode-reader of the mobile device 20 (smartphone) said 2D-barcode 400, forming thereby a picture 400' (scanned 2D-barcode) of said 2D-barcode 400 decoding primary information contained in primary information pattern 410 (this primary information can contain indication about geometric localisation of the visible pattern containing secondary information which contains relevant information for cropping and authenticating)

identifying (locating) within said picture 400' said visible pattern 420 (by cropping) and identifying (locating) within said secondary information said secret (in FIG. 4 zone 426) thereby forming a detected secret, comparing (for instance by image correlation function) said detected secret to a secret key (or secret) of a source 2D bar-code, which is not available in said mobile device 20, and determining as a result of the comparison a secret similarity score comparing said secret similarity score to a predetermined secret threshold, establishing an authentication secret result being success (original 2D barcode) if said result is equal to or more than said predetermined secret threshold or being failure (copy and therefore non-original 2D barcode) if said result is less than said predetermined secret threshold.

Alternatively to the option of comparing said detected secret to the secret key of said source 2D barcode (situation with a first predetermined secret threshold), another option consists in comparing said detected secret to the secret key of series of previous scans of original 2D barcodes and which is adapted along the time with new scans of original 2D barcodes (situation with a second predetermined signature threshold different from said first predetermined signature threshold).

Said secret key is stored in said remote device (remote server 30). For instance, said secret key of said source 2D barcode is obtained by a second algorithm using said second key K2 which is only present in the remote server 30 (secure database), and optionally by using a portion of said primary information (portion of the primary information pattern 410 forming a unique ID). For this second method of authentication, preferably said mobile device 20 is connected to a remote device (remote server 30), wherein said secret key (or previous scans) is stored on said remote device (remote server 30) which implements the comparison step between said detected secret and said secret key, and wherein said method further comprises sending back said authentication secret result to said mobile device 20.

Previously described first and second methods of authentication can be combined. In this way, it constitutes an interesting compromise since a part of the visible pattern is verified on the mobile device (the "first-level authentication") and a part of the visible pattern is verified on the secure server (the second level authentication). The low security check is performed real-time when the QR Code (or primary information pattern 410) is decoded, on a part of the of the visible pattern which can be generated on the mobile device with the corresponding first key k1 (stored on the mobile device) and signature threshold (hardcoded in the QR code message—or primary information pattern—or pre-downloaded from the server). This low security check may serve as a form of image quality validation: if the score (authentication signature result) is over the predetermined signature threshold, or the score is under the predetermined signature threshold and additional validation confirms the scan is suitable for analysis, the visible pattern is cropped from the scan and sent to the server, together with the QR code message, and all relevant information from the low security check, such as geolocation and mobile device ID. While the mobile device is awaiting the server high security check, a message can already be shown to the user. In the case where the score is over the predetermined signature threshold for the low security check, this message might be "Read as original, waiting for results of high security check from server". If it is under the predetermined signature threshold, detection may already show a message indicating that the server 30 receives the cropped visible pattern and the QR code message (primary information pattern), as well as the additional information formed by the secondary information. The QR Code message (primary information pattern) allows to retrieve the reference fingerprint data (original secondary information contained in the visible pattern) needed to make the high security check. This information may either be the portions of the visible pattern source data generated with the TRNG (second key K2), or reference scans of the same visible pattern. One or more image matching are made, so that one or more scores (authentication secret result(s)) are produced. A score (authentication signature result or authentication secret result) calculated by image matching with the source visible pattern (secondary information of the source 2D barcode) will generally be on a different scale than the score calculated by comparison with a reference scan, so different threshold values may be used depending on the visible pattern or part of the visible pattern used for image matching.

If there is one score comparison to a predetermined signature threshold on the mobile device (low security check) and one or more score comparison with corresponding predetermined secret thresholds on the secure server 30 (high security check), the return message from the server to the device can be any of the following:

all scores over the threshold: original, all scores under the threshold: copy low security check score under threshold and all high security check scores over threshold: ask to scan again (probably an original but the scan was not correctly matched on the mobile device), low security check score over threshold and all high security check scores under threshold: suspicion of fraud, as this might indicate that the counterfeiter has accessed keys stored in a remote device to replicate correctly the corresponding portion of the fingerprint, but not the other portions of the fingerprint.

non-coherent results, e.g. some scores are over the threshold and others under the threshold: ask user to scan again and/or to keep product for further investigation.

Let us consider the scenario where a device would be hacked and some signature keys used for the low security check stolen. A counterfeiter might then be able to produce QR codes (primary information patterns) with a signature which is detected as authentic on the device. The low security check will probably obtain a score over the signature threshold. However, the high security checks on the secure server 30, would most likely give scores under the signature threshold. Therefore, a few seconds later or even less (with good connectivity) the output message would indicate the fraud to the user.

Thanks to this process of making high security check on the server, the security is not weakened by storing some of the information (first key K1 for instance) to generate signature keys in the mobile device. Furthermore, this process does not affect the user experience as he receives an immediate response (at least in the case the visible pattern is authentic), and in case of anomaly this response can be quickly corrected (with good connectivity). If there is no connectivity, the user will receive warnings if the case applies, as soon as the mobile device 20 is re-connected to the remote server 30.

In an aspect of the invention, a method of authenticating a 2D barcode using a local device, comprises the steps of: scanning said 2D barcode using the local device to generate at least one image frame, reading from the image frame primary information in said local device, extracting from the image frame secondary information in said local device, generating a portion of secondary information using a key stored in the local device, said portion comprising or forming a signature of the secondary information, and comparing said signature of the secondary information with the extracted secondary information to verify the authenticity at a first local level of the 2D barcode.

The method may further comprise sending the primary information or an information correlated thereto, and an image of the extracted secondary information, to a remote server, and authenticating the 2D barcode at a second level by comparing the image of the extracted secondary information with an original 2D barcode image stored or generated in the remote server.

The comparison of said signature of the source secondary information with the extracted secondary information may advantageously generate a score.

In an embodiment of the authentication method, the scanning of said 2D barcode using the local device generates a plurality of images frames, resulting in a plurality of scores, said plurality of scores being used to determine if a second level authentication by a remote server is to be performed.

In an embodiment, the authentication method may comprise verifying image quality of the at least one image frame to determine whether said image is suitable for authentication of the 2D barcode by a remote server.

A technique for verifying image quality, according to an embodiment, includes extracting from the image frame secondary information in said local device, generating a portion of secondary information using a key stored in the local device, said portion comprising or forming a signature of the secondary information, comparing said signature of the secondary information with the extracted secondary information to generate a score, using set of scores as an indicator of image quality.

In another embodiment, a technique for verifying image quality includes measuring sharpness of transition between black and white cells of primary information.

Referring to FIG. 8, an exemplary embodiment of a method of authentication according to the invention may comprise the following steps:

Step 8-1: Empty memory of mobile device of stored fingerprints (secondary information) and scores;

Step 8-2: Extract bitmap image from video stream;

Step 8-3: Decode 2D code in image. If decoding not successful go back to step 8-1 (message=null), else receive message and code positioning data in image (e.g. corners of 2D barcode, or position of detection patterns) and go to next step 8-4;

Step 8-4: Verify (in mobile phone) message signature (message signature can be a hash of part of the message content that should match another part of message content). If message signature is not verified, then output message to user "This is not a 2D barcode with readable secondary information" with button proposing to make another scan. After user presses button go back to step 8-1. If message is verified, go to next step 8-5;

Step 8-5: Extract parameters from message, including image quality threshold, secret key or secret index of key stored in mobile device for local verification and quality measurement, 2D code size, code unique ID, and other parameters required for verification;

Step 8-6: If size of 2D code is available in parameters (or default expected size can be assumed otherwise), compare with expected size as percentage of image size. If scanned image size is too small return message to user "Get closer to 2D code" (alternatively "Get further away from 2D code") and return to step 8-1 (see below for example algorithm to measure size);

Step 8-7: Check if image appears sharp enough to be used for authentication, by running an image sharpness measurement algorithm (see below for example algorithm). If value is over threshold, proceed to next step. Else, in option show message to user "Touch screen to autofocus", then go to step 8-1;

Step 8-8: From scanned image and 2D code positioning data, extract image of fingerprint (secondary information) area. The extracted image can be simply a crop, or a transformed image to correct the perspective transform and to a size suitable for authentication;

Step 8-9: With secret key, generate portion of source fingerprint (secondary information);

Step 8-10: Measure image similarity between generated portion of source fingerprint and extracted fingerprint area, to obtain score;

Step 8-11: Store extracted fingerprint and score in memory;

Step 8-12: If condition C (see below) is met OR condition D is met, then

Step 8-13: Send fingerprint with highest score to server (alternatively send all fingerprints), and information useful for authentication including 2D barcode message, estimated barcode size (which can be taken into account for authentication). Otherwise return to step 8-2;

Step 8-14: Wait until authentication result is received from server and display received authentication result On Server, step 15:
  Receive 2D barcode message, or alternatively code ID, one or multiple scanned fingerprints and their associated scores
  Retrieve authentication data from code ID (comparison parameters, past scans, source fingerprint)
  Compare one or more scanned fingerprint with source fingerprint and use comparison parameters to take decision on authenticity
  Return authentication result Conditions C and D:
  Example of Condition C: At least 3 consecutive image frames with score over quality threshold; alternatively 3 frames in the last 5 with score over quality threshold; alternatively all frames in the last second with score over quality threshold
  Example of Condition D: At least 6 consecutive image frames with score under threshold; alternatively all frames in the last 2 seconds with score under threshold but the difference of score between the minimum and maximum scores obtained in all the frames is under a second threshold value Example of Image Size Measurement:
  Screen has width of 1080 pixels, and for zoom factor of value 25, defined in mobile device, it has been measured that a code of 1 cm in width should occupy approximately to 60% of the screen to be read optimally (in the sense of having the highest score). Under 50% of the screen size, significant secondary information is lost which makes authentication less reliable. Over 70%, the 2D barcode is too close and the device is not able to focus.

Target pixel size is therefore 648 pixels for a code of 1 cm, and size should be between 540 and 756 pixels.

If 2D barcode size stored in parameters is different from 1 cm, those values can easily be adapted.

Example of Image Sharpness Measurement Algorithm:
  2D barcode are composed of alternating black and white zones with a sharp transition. If the image is not in focus, the transition will tend to be less sharp, and occupy a larger number of pixels in the images. There are a number of ways to measure sharpness of transition. One preferred way consists in the following:

For each cell in scanned image excluding secondary information area, determine whether cell was originally black or white (this can be done from the re-encoded 2D barcode or is generally done during the 2D barcode decoding process).

Determine reference value which is lowest grayscale value for black cells, alternatively highest grayscale value for white cells Determine acceptance threshold, which can be for example 30 grayscale value from reference value Determine transition regions. There are a maximum of 4 transition regions per cell, depending on whether the cells on top, left, right, bottom or of the same colour or not. The transition region is typically composed of 10 to 20% of pixels on the side of the cell that are closest to the next cell of different colour.

Determine the proportion of pixels that are over, respectively below the acceptance threshold (for black cells, respectively white cells) in the transition; This is done for all transition regions in the scan If the total proportion of pixels in transition region is over a threshold (which may be adjusted on the mobile device and/or the print specificities of 2D barcode), then the image is considered as no in focus and therefore not suitable for authentication.

Referring to FIGS. 9 and 10*a*, 10*b*, showing an example of a 2D barcode according to an embodiment of the invention, the secondary information forming the visible pattern 120 may be a random set of binary pixels values, where any pixel can have a certain default probability (30, 40, 50%, etc) to be black or white. One portion of the pattern is verified remotely, on a server where it is possible to store the pixel values, and/or the means to re-generate them. Another portion of the pattern can be verified locally on for instance a mobile phone, and is preferably generated with one of a limited set of cryptographic keys using for instance a standard cryptographic algorithm.

Contrarily to conventional 2D bar codes, the 2D bar codes according to embodiments of the invention have identification information which can be authenticated using the visible authentication pattern of the secondary information. In conventional bar codes with a second smaller bar code embedded in a primary barcode as described in US2012/0256000, decoding of the smaller barcode does not provide proof of authenticity. Furthermore, if the smaller second barcode is unreadable, one is left with the ambiguous situation where the information might indeed be unreadable because it has been badly copied, or it might be unreadable because of a number of other reasons such as implementation issues.

In advantageous embodiments, the secondary information does not contain information other than authentication information enabling authentication of the visible pattern. This allows to retrieve the authentication information without having to retrieve other information, such that the authentication information can be decoded with maximum likelihood.

Figure 11B:
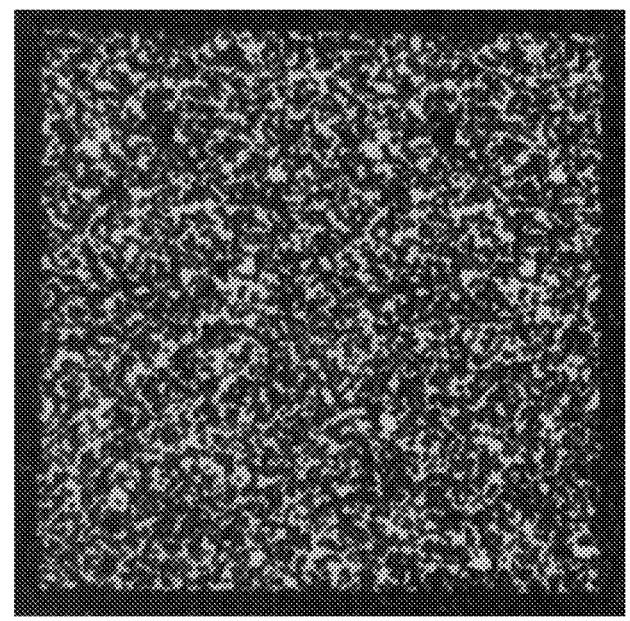
FIG. 11a is an enlarged view of the visible pattern of the embodiment of FIG. 10b after printing (first original print) and FIG. 11b is a copy (scan and reprint) of the original print of FIG. 10b.
Figure 11A:
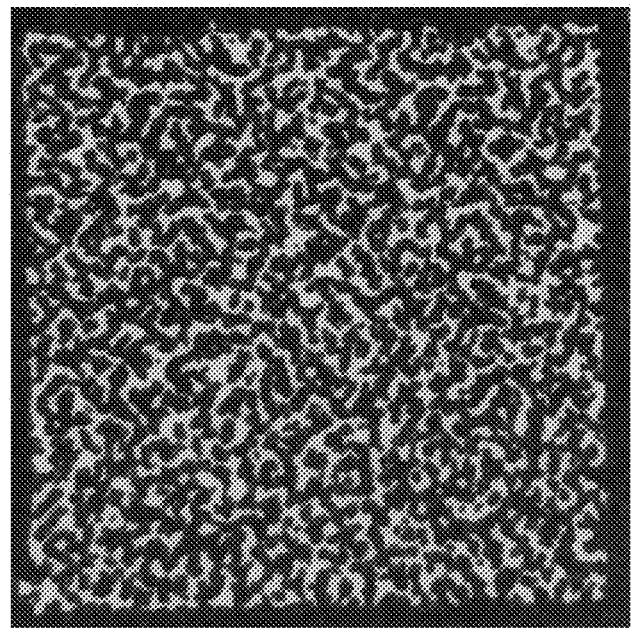

As can be seen in FIGS. 10*a*, 10*b*, the visible pattern 120 comprising the secondary information looks very randomized and chaotic, which improves the effectiveness in discerning originals from copies of originals. FIG. 10b shows a representation of the visible pattern 120 of secondary information before printing, the width of the visible pattern 120 being for instance in the order of 2 mm to 4 mm. FIG. 11a shows the visible pattern 120a of secondary information after printing, whereby FIG. 11a represents therefore an original first print. As can be seen on FIG. 11a the visible pattern 120a of the first original has been altered but retains some of its original aspect. FIG. 11b represents a copy 120b, for instance made with a high resolution scanner, followed by image processing and then reprinting on the same printer and paper. The copy 120b in FIG. 11b is however significantly different from the original file and from the original first print, and the alteration can be detected.

REFERENCE NUMBERS USED ON THE FIGURES

10 Document
20 Mobile device
30 Remote server
100 2D barcode
102 elementary cell
110 Primary information pattern
121 Secondary information border
120 Visible pattern with secondary information
120a First portion of visible pattern with first low average black density
120b Second portion of visible pattern second high average black density
120c Third portion forming the boundary of visible pattern
122 elementary sub-cell
130 Position detection pattern
132 data area
200 2D barcode (second embodiment)
210 Primary information pattern
220 Visible pattern with secondary information with medium average black density
232 data area
300 2D barcode (third embodiment)
310 Primary information pattern
320 Visible pattern with secondary information with medium average black density
320a square First portion of visible pattern with first low average black density
320b Second portion of visible pattern with second high average black density
$320b_1$-$320b_4$ square Sub-part of Second portion
332 data area
400 2D barcode (fourth embodiment)
400' scanned 2D-barcode (picture)
410 Primary information pattern
420 Visible pattern with secondary information with high average black density
424 signature zone
426 secret zone
426a first data portion of secret zone
426b Second data portion of secret zone
432 data area
500 2D barcode (fifth embodiment)
510 Primary information pattern
520 Visible pattern with secondary information with medium average black density
$520_1$ First portion of visible pattern with medium black density
$520_2$ second portion of visible pattern with medium black density
532 data area
600 2D barcode (sixth embodiment)
610 Primary information pattern
620 Visible pattern with secondary information with medium average black density
632 data area

The invention claimed is:

1. A method of authenticating 2D barcode on a product including the 2D-barcode, the 2D-barcode including a primary information pattern representing primary information readable by a 2D barcode-reader and a visible pattern representing secondary information made difficult to reproduce without alteration, the visible pattern being embedded within the 2D-barcode in at least one area that does not contain any primary information and including light and dark elementary sub-cells smaller than 50 μm, the method comprising
    reading with the 2D barcode-reader said 2D-barcode;
    identifying said visible pattern and identifying within said secondary information a secret, thereby forming a detected secret;
    comparing said detected secret to a secret key of a source 2D-barcode and determining, as a result of the comparing, a secret similarity score;
    comparing said secret similarity score to a secret threshold; and
    establishing an authentication secret result as successful if said result is equal to or more than said secret threshold, or being failure if said result is less than said secret threshold.

2. The method of claim 1, wherein said 2D-barcode includes a modified QR code or Datamatrix in the form of a symbol forming a data area comprising position detection patterns located at three corners of said symbol, primary information represented by a primary information pattern and secondary information represented by a visible pattern.

3. The method of claim 2, wherein said QR code is a 29×29 elementary cells type QR code or a 33×33 elementary cells type QR code.

4. The method of claim 1, wherein said visible pattern is wholly contained in a rectangle with only secondary information.

5. The method of claim 4, wherein said visible pattern is formed in a 7×7 pixels or a 8×8 or a 9×9 elementary cell zone or in a 10×10 elementary cell zone.

6. The method of claim 1, wherein said visible pattern is located inside the limit of said primary information pattern.

7. The method of claim 1, wherein said visible pattern overlap the centre of said primary information pattern.

8. The method of claim 1, wherein said visible pattern is located outside a limit of said primary information pattern.

9. The method of claim 1, wherein said visible pattern contains a signature that is locally verifiable by a device directly connected to the 2D-barcode reader to check the authenticity of the 2D-barcode.

10. The method of claim 1, wherein the authenticity of said secret in said visible pattern is only verifiable by using a remote device.

11. The method of claim 1, wherein said secret key is randomly or pseudo-randomly generated.

12. The method of claim 1, wherein said 2D barcode-reader is part of a mobile device, connected to a remote device, wherein said secret key of said source 2D-barcode is stored on said remote device, the remote device being configured to implement the comparing between said detected secret and said secret key, and wherein said method further comprises sending back said authentication secret result to a said mobile device.

13. The method of claim 12, wherein said mobile device is a smartphone.

14. A non-transient computer-readable medium comprising instructions tangibly stored thereon that, when executed by a processor, perform the method of claim 1.

15. A computing apparatus comprising:
a processor; and
a memory having stored thereon instructions that, when executed by the processor, perform the method of claim 1.

16. A method of authenticating of a 2D barcode on a product including the 2D barcode, the 2D barcode including a primary information pattern representing primary information readable by a 2D barcode-reader and a visible pattern representing secondary information made difficult to reproduce without alteration, the visible pattern being embedded within the 2D barcode in at least one area that does not contain any primary information, including light and dark elementary sub-cells smaller than 50 μm, and including a signature, the method comprising:
reading, with the 2D barcode-reader, said 2D-barcode;
identifying said visible pattern and identifying within said secondary information said signature thereby forming a detected signature;
comparing said detected signature to a signature key and determining, as a result of the comparing, a signature similarity score;
comparing said signature similarity score to a signature threshold; and
establishing an authentication signature result as successful if said result is equal to or more than said signature threshold, or being a failure if said result is less than said signature threshold.

17. The method of claim 16, wherein said 2D barcode-reader is part of a mobile device and wherein said signature key is stored on said mobile device, the mobile device being configured to implement the comparing between said detected signature and said signature key.

18. A non-transient computer-readable medium comprising instructions tangibly stored thereon that, when executed by a processor, perform the method of claim 16.

19. A computing apparatus comprising:
a processor; and
a memory having stored thereon instructions that, when executed by the processor, perform the method of claim 16.

20. A method of manufacturing a product including a 2D barcode, the 2D barcode including a primary information pattern representing primary information readable by a 2D barcode-reader and a visible pattern representing secondary information made difficult to reproduce without alteration, the visible pattern being embedded within the 2D barcode in at least one area that does not contain any primary information and including light and dark elementary sub-cells smaller than 50 μm, the method comprising:
printing the secondary information with offset printing; and
subsequently printing primary information with inkjet printing.

* * * * *

UNITED STATES PATENT AND TRADEMARK OFFICE
CERTIFICATE OF CORRECTION

| | |
|---|---|
| PATENT NO. | : 9,594,993 B2 |
| APPLICATION NO. | : 15/032066 |
| DATED | : March 14, 2017 |
| INVENTOR(S) | : Justin Picard et al. |

It is certified that error appears in the above-identified patent and that said Letters Patent is hereby corrected as shown below:

On the Title Page

(73) Assignee should read: SCANTRUST SA

Signed and Sealed this
Eighth Day of August, 2017

Joseph Matal
*Performing the Functions and Duties of the*
*Under Secretary of Commerce for Intellectual Property and*
*Director of the United States Patent and Trademark Office*